US009641652B2

(12) United States Patent
Kwong et al.

(10) Patent No.: US 9,641,652 B2
(45) Date of Patent: May 2, 2017

(54) METHOD FOR ENABLING INTERCEPTION, DECODING AND/OR PROCESSING OF A MAC LEVEL MESSAGE

(71) Applicant: TELEFONAKTIEBOLAGET L M ERICSSON (PUBL), Stockholm (SE)

(72) Inventors: Waikwok Kwong, Solna (SE); Jose Luis Pradas, Stockholm (SE); Alessandro Caverni, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 97 days.

(21) Appl. No.: 14/764,049

(22) PCT Filed: Nov. 19, 2013

(86) PCT No.: PCT/SE2013/051352
§ 371 (c)(1),
(2) Date: Jul. 28, 2015

(87) PCT Pub. No.: WO2014/116156
PCT Pub. Date: Jul. 31, 2014

(65) Prior Publication Data
US 2016/0006843 A1    Jan. 7, 2016

Related U.S. Application Data

(60) Provisional application No. 61/757,327, filed on Jan. 28, 2013.

(51) Int. Cl.
*H04L 29/12*      (2006.01)
*H04L 29/06*      (2006.01)
(Continued)

(52) U.S. Cl.
CPC .......... *H04L 69/22* (2013.01); *H04L 61/6022* (2013.01); *H04W 24/08* (2013.01);
(Continued)

(58) Field of Classification Search
CPC ............. H04L 63/123; H04L 29/12839; H04L 61/6022; H04L 63/0876; H04L 2012/6448; H04W 12/02; H04W 12/12
See application file for complete search history.

(56) References Cited

U.S. PATENT DOCUMENTS

| 2007/0275657 | A1* | 11/2007 | Chang .................. H04L 1/1854 455/9 |
| 2008/0267405 | A1* | 10/2008 | Vialen .................. H04L 63/123 380/270 |

(Continued)

FOREIGN PATENT DOCUMENTS

| WO | WO 2008/019534 A1 | 2/2008 |
| WO | WO 2012/105877 A1 | 8/2012 |
| WO | 2012/138128 A2 | 10/2012 |

OTHER PUBLICATIONS

3rd Generation Partnership Project; Technical Specification Group Radio Access Network; Physical Layer; Measurements (FDD) (Release 11). 3GPP TS 25.215 v11.0.0 (Dec. 2011).
(Continued)

*Primary Examiner* — Raj Jain

(57) ABSTRACT

There is disclosed a method in a User Equipment, UE, for enabling interception, decoding and/or processing of at least parts of a Media Access Control, MAC, level message. The method comprises the steps of receiving configuration information comprising information to add additional information to a MAC level message, and creating a bit string representing the additional information. The method also comprise the step of adding the created bit string to the MAC level message, to enable a recipient of said MAC level message to determine, based on the additional information represented by the bit string, whether at least part of a payload of the MAC level message is to be intercepted, decoded and/or processed. There is further disclosed a
(Continued)

MAC –i PDU method in a base station for decoding a corresponding MAC level message. A corresponding User Equipment, UE, and a base station configured for the methods are also disclosed.

30 Claims, 29 Drawing Sheets

(51) Int. Cl.
*H04W 24/08* (2009.01)
*H04W 24/10* (2009.01)
*H04L 1/00* (2006.01)

(52) U.S. Cl.
CPC .......... *H04W 24/10* (2013.01); *H04L 1/0045* (2013.01); *H04L 1/0083* (2013.01); *H04L 63/0876* (2013.01)

(56) References Cited

U.S. PATENT DOCUMENTS

| 2009/0052388 | A1 | 2/2009 | Kim et al. |
| 2009/0092039 | A1 | 4/2009 | Niu et al. |
| 2010/0226325 | A1 | 9/2010 | Chun et al. |
| 2010/0303095 | A1 | 12/2010 | Joo et al. |
| 2012/0113837 | A1 | 5/2012 | Siomina et al. |
| 2012/0207041 | A1 | 8/2012 | Piernot et al. |
| 2016/0006843 | A1* | 1/2016 | Kwong ................. H04W 24/08 370/338 |

OTHER PUBLICATIONS

3rd Generation Partnership Project; Technical Specification Group Radio Access Network; Medium Access Control (MAC) Protocol Specification (Release 11). 3GPP TS 25.321 V11.2.0 (Sep. 2012).
3rd Generation Partnership Project; Technical Specification Group Radio Access Network; Radio Resource Control (RRC); Protocol Specification (Release 11). 3GPP TS 25.331 V11.4.0 (Dec. 2012).
3rd Generation Partnership Project; Technical Specification Group Radio Access Network; Radio Interface Protocol Architecture (Release 11). 3GPP TS 25.301 V11.0.0 (Sep. 2012).
3rd Generation Partnership Project; Technical Specification Group Radio Access Network; High Speed Downlink Packet Access (HSDPA); Overall description; Stage 2 (Release 11). 3GPP TS 25.308 V11.3.0 (Jan. 2013).

* cited by examiner

Protocol Termination for DCH, user plane

CTCH:

DTCH:

BCCH:

CCCH:

SHCCH:
(TDD only)

DCCH:

Protocol termination points for HS-DSCH, control plane

Protocol termination points for E-DCH for DCCH, control plane

Measurement Control, normal case

Measurement report, normal case

METHOD FOR ENABLING INTERCEPTION, DECODING AND/OR PROCESSING OF A MAC LEVEL MESSAGE

This application claims the benefit of US Provisional Application No. 61/757,327, filed Jan. 28, 2013, the disclosure of which is fully incorporated herein by reference.

TECHNICAL FIELD

The proposed technology relates in general to technology for improved handling of MAC level messages that will enable interception, decoding and/or processing of at least part of a MAC level message.

BACKGROUND

The technology in this application is described in an example Universal Mobile Telecommunications System (UMTS)/Wideband Code Division Multiple Access (WCDMA) context, where Evolved HSPA extends and improves the performance of existing $3^{rd}$ generation (3G) mobile telecommunication networks using WCDMA protocols. A simplified 3G Universal Terrestrial Radio Access Network (UTRAN) for understanding the basic foundation of an Evolved HSPA system is shown in FIG. 1a. A Radio Network Controller (RNC) communicates with one or more core network nodes which are connected to one or more other networks, e.g., the Internet, public and private telephone networks, etc., over IuCS and IuPS interfaces. The RNC also communicates with one or more NodeBs over and IuB interface and other RNCs over an IuR interface. NodeB is the term used in 3G for a radio base station. NodeBs and User Equipments (UEs) communication over an air interface Uu using radio communications.

In HSPA and HSPA+ today, it is desirable to locate more functionalities in the NodeB rather than the RNC. But this creates multiple problems. One problem is the RNC setting up many UE measurements on behalf of the NodeB and then relaying the measurement reports received from UEs via the NodeB to the NodeB. The RNC may or may not have performed additional processing on such reports before relaying them back to the NodeB. This causes delay of the measurement reports and extra processing in the RNC.

While it is possible to intercept the measurement reports in the NodeB by "sniffing" all uplink (UL) upper protocol layer, e.g., RRC signaling, messages, this is problematic. Using RRC signaling messages as an example, "sniffing" all RRC messages means that the NodeB must at least partially decode all RRC messages, the NodeB must use the ASN.1 syntax for the RRC messages, and that the current protocol architecture is violated. Another, a second, problem is that, for computer-implemented functionalities that do not involve the RNC or the RRC protocol layer, there are currently only limited means of communication between the UE and the NodeB or other network nodes at the MAC or lower level.

SUMMARY

It is a general object to provide technology that enables improved handling of MAC level messages.

According to a first aspect there is provided, a method performed by a User Equipment, UE, for enabling interception, decoding and/or processing of at least parts of a Media Access Control, MAC, level message. The method comprises the steps of, receiving configuration information comprising information to add additional information to a MAC level message and creating a bit string representing the additional information. It also comprises the step of adding the created bit string to the MAC level message, to enable a recipient of the MAC level message to determine, based on the additional information represented by the bit string, whether at least part of a payload of the MAC level message is to be intercepted, decoded and/or processed.

In this way it is provided a mechanism that provides for a more efficient use of resources in nodes in a network since it enables a recipient of the MAC level message to only decode parts of a message to determine whether the payload of the message shall be intercepted, decoded and/or processed.

A second aspect of the proposed technology involves a method performed by a base station for determining whether at least part of a Media Access Control, MAC, level message, is to be intercepted, decoded and/or processed. The method comprises the steps of, receiving a MAC level message comprising an added bit string comprising information whether at least part of a payload of the MAC level message is to be intercepted, decoded and/or processed and decoding the bit string, added to the MAC level message, to determine whether the bit string comprises information indicating that at least part of a payload of the MAC level message is to be intercepted, decoded and/or processed.

In this way the NodeB is provided with a method that renders it possible to determine whether it is advantageous to intercept, decode and/or process a payload of a MAC level message. There is therefore no need to randomly intercept payloads of MAC level messages.

According to a third aspect of the technology there is provided a User Equipment, UE, that is configured to enable interception, decoding and/or processing of at least parts of a Media Access Control, MAC, level message. The UE comprises, a radio transceiver configured for receiving configuration information comprising information to add additional information to a MAC level message and a MAC Controller configured for creating a bit string representing the additional information and adding the created bit string to the MAC level message, to enable a recipient of the MAC level message to determine, based on the information represented by the bit string, whether at least part of a payload of the MAC level message is to be intercepted, decoded and/or processed.

According to a fourth aspect of the proposed technology there is provided a base station that is configured for determining whether at least part of a MAC level message should be intercepted, decoded and/or processed. The base station comprises a radio transceiver configured for receiving a MAC level message with an added bit string comprising information whether at least part a payload of the MAC level message is to be intercepted, decoded and/or processed, and a MAC controller configured for decoding the bit string added to the MAC level message to determine whether the bit string comprises information indicating that at least part of a payload of the MAC level message should be intercepted, decoded and/or processed.

According to a fifth aspect there is provided a User Equipment, UE, for enabling a recipient of a Media Access Control, MAC, level message to determine whether at least part of a payload of the MAC level message is to be intercepted, decoded and/or processed. The UE comprises an input module for receiving configuration information comprising information to add additional information to a MAC level message. It also comprises a bit string creating module for creating a bit string representing the additional information and a bit string adding module for adding the created bit string to the MAC level message, to enable a recipient of the MAC level message to determine, based on the information represented by the bit string, whether at least part of a payload of the MAC level message is to be intercepted, decoded and/or processed.

According to a sixth aspect there is provided a Base station for determining whether at least part of a Media Access Control, MAC, level message should be intercepted, decoded and/or processed. The base station comprises an input module for receiving a MAC level message comprising an added bit string comprising information whether at least part a payload of the MAC level message is to be intercepted, decoded or processed. The base station also comprises a decoding module for decoding the bit string, added to the MAC level message, to determine whether the bit string comprises information indicating that at least part of the payload of the MAC level message is to be intercepted, decoded and/or processed.

Other advantages of the proposed technology will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
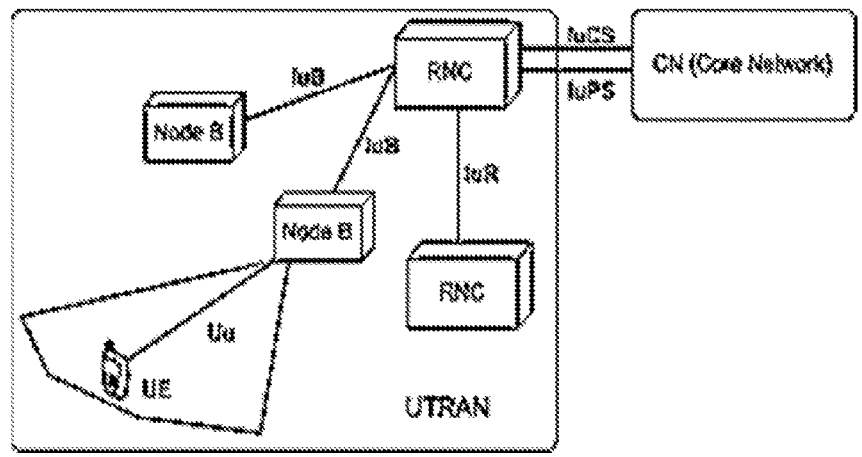
FIG. 1a is a schematic illustration of a Network in which the proposed technology could be implemented.
FIG. 1b is a schematic signaling scheme illustrating protocol termination for DCH, user plane.
Figure 1:
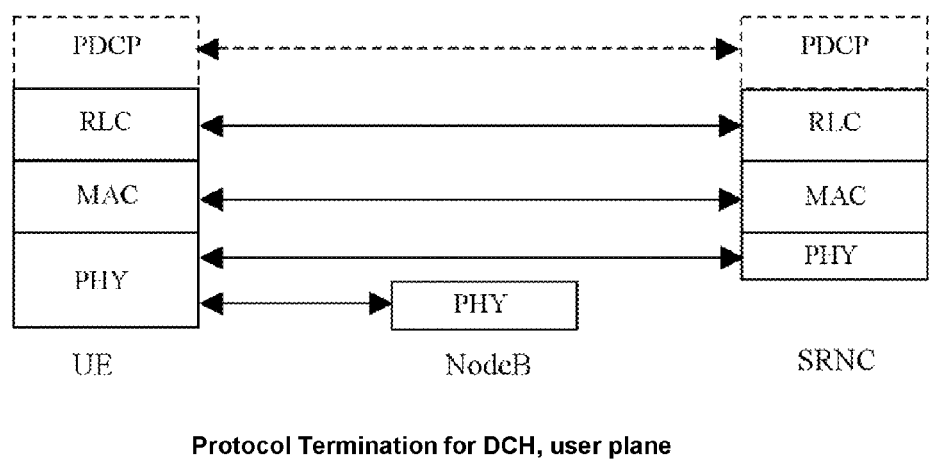

Throughout the drawings, the same reference numbers are used for similar or corresponding elements.

For a better understanding of the proposed technology, it may be useful to begin with a brief overview of a particular environment where the proposed technology may be utilized.

In what follows below, various non-limiting example embodiments are described for an evolved HSPA network using HSPA nomenclature, signaling messages and formats, and protocols. Another example embodiment provides a generalization of for Enhanced Uplink (EUL) Scheduling Information for MAC-level communications.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any wireless device or node equipped with a radio interface allowing for at least one of: transmitting signals in UL and receiving and/or measuring signals in DL. Some examples of UE in its general sense are PDA, laptop, mobile, sensor, fixed relay, mobile relay, a radio network node (e.g., an LMU or a femto base station or a small base station using the terminal technology). A UE herein may comprise a UE (in its general sense) capable of operating or at least performing measurements in one or more frequencies, carrier frequencies, component carriers or frequency bands. It may be a "UE" operating in single- or multi-RAT or multi-standard mode.

A cell is associated with a base station, where a base station comprises in a general sense any node transmitting radio signals in the downlink (DL) and/or receiving radio signals in the uplink (UL). Some example base stations are eNodeB, eNB, Node B, macro/micro/pico radio base station, home eNodeB, relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

The signaling described is either via direct links or logical links (e.g. via higher layer protocols and/or via one or more network nodes). For example, signaling from a coordinating node may pass another network node, e.g., a radio node.

The example embodiments that will be given below are described in the non-limiting example context of a UTRAN type system for evolved HSPA using HSPA nomenclature, signaling messages and formats, and protocols. However, the technology is not limited to UTRAN, but may apply to other types of Radio Access Networks (RANs). If applying the technology to another RAN, those skilled in the art will understand that the protocol layer entities may have different names and functionalities.

Figure 2:
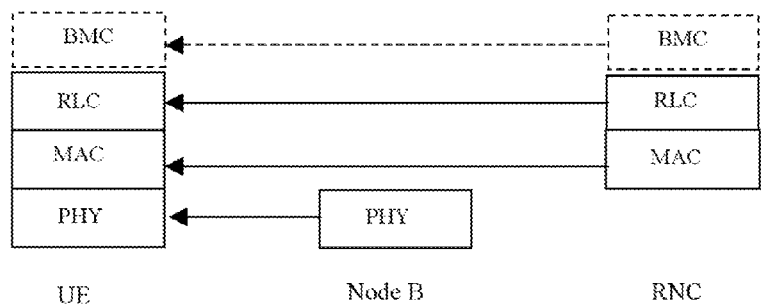
FIG. 2 is a schematic signaling scheme illustrating protocol termination for RACH/FACH, user plane.
Figure 2:
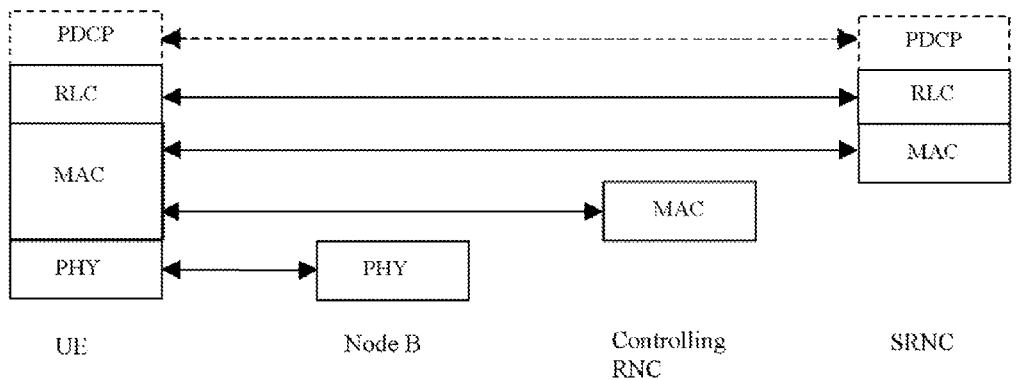
Figure 3:
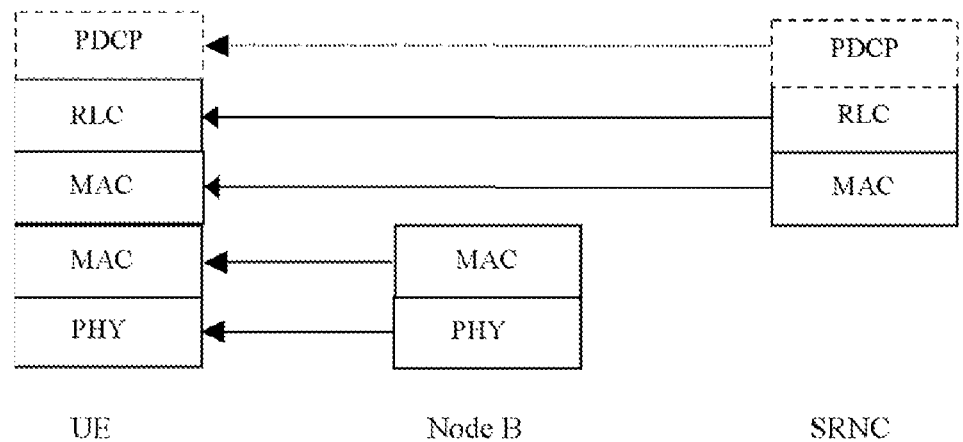
FIG. 3a is a schematic signaling scheme illustrating protocol termination for HS-DSCH, user plane.
FIG. 3b is a schematic signaling scheme illustrating protocol termination for E-DCH, user plane.
Figure 3:
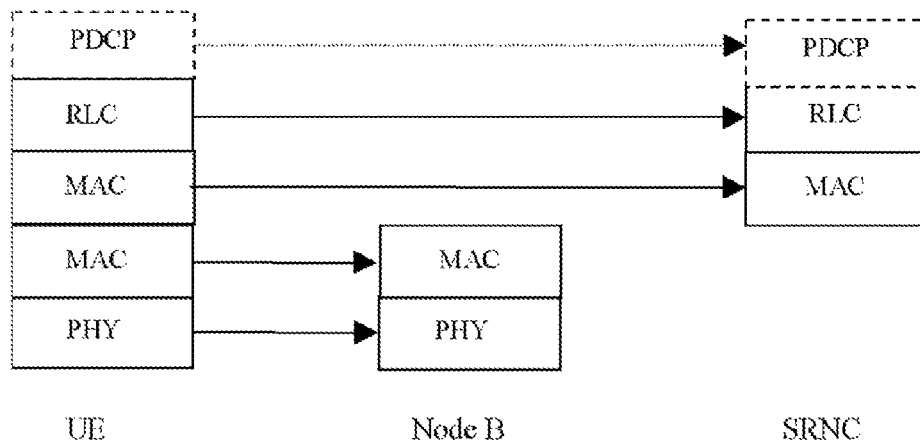
Figure 4:
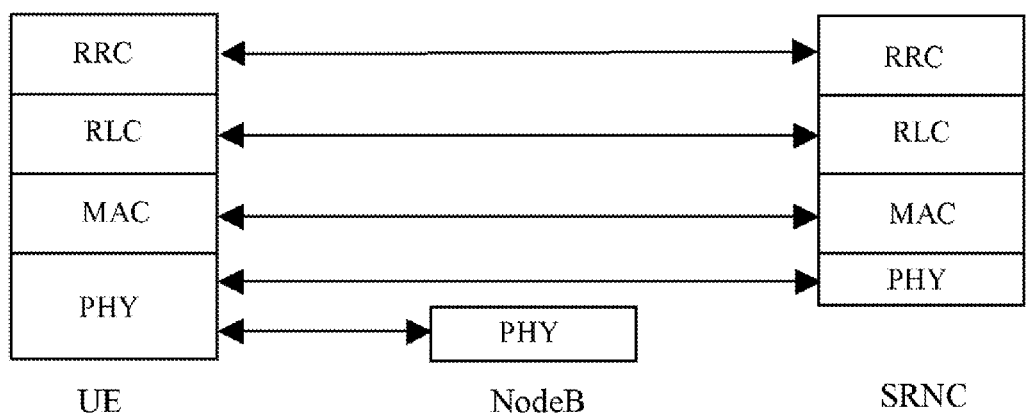
FIG. 4 is a schematic signaling scheme illustrating protocol termination for DCH, control plane
Figure 5:
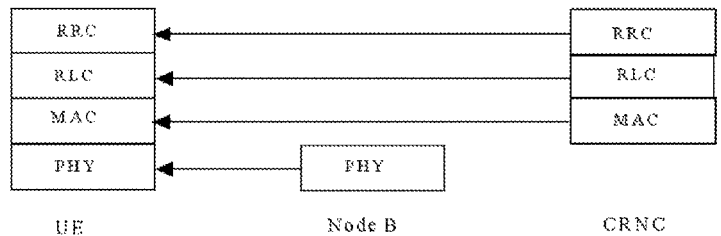
FIG. 5 is a schematic signaling scheme illustrating protocol termination for RACH/FACH, control plane
Figure 5:
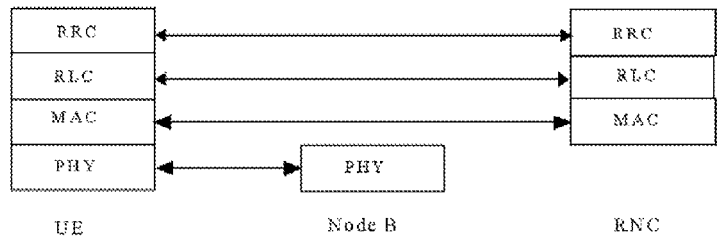
Figure 5:
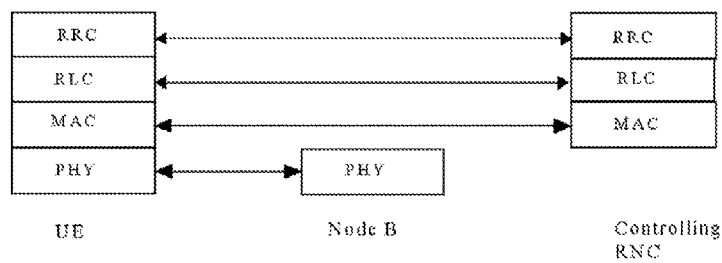
Figure 5:
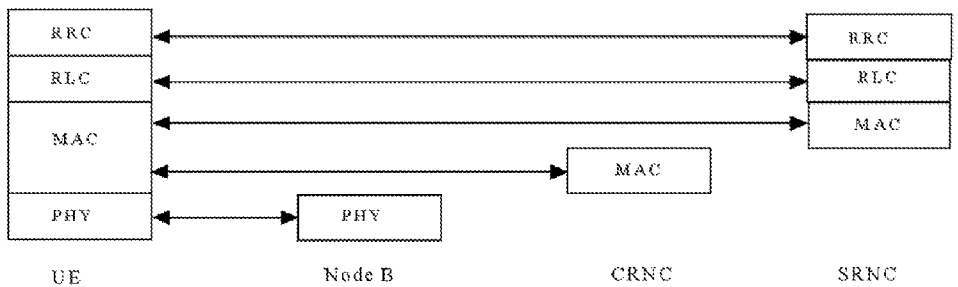
Figure 6:
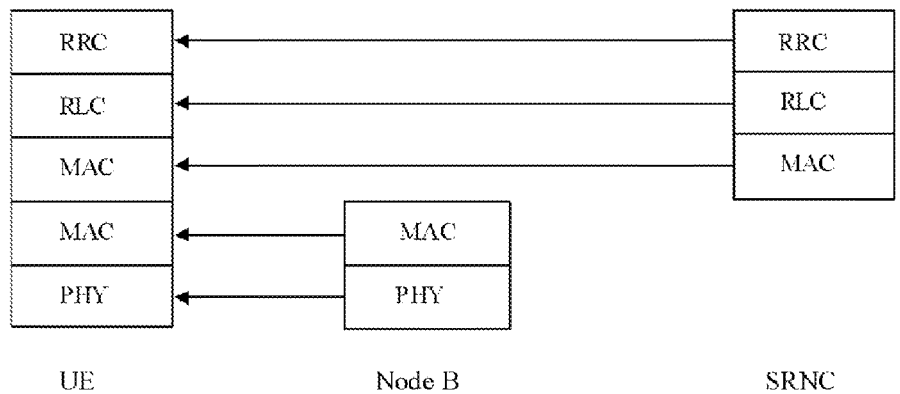
FIG. 6a is a schematic signaling scheme illustrating protocol termination points for HS-DSCH, control plane.
FIG. 6b is a schematic signaling scheme illustrating protocol termination for E-DCH for DCCH, control plane.
Figure 6:
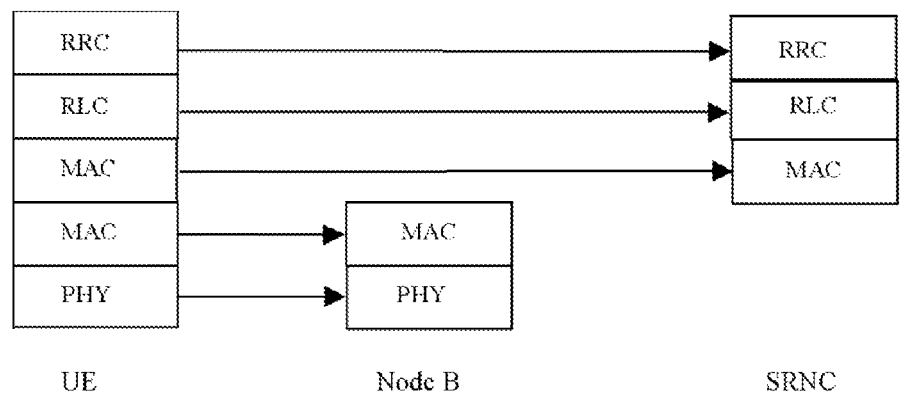
Figure 7:
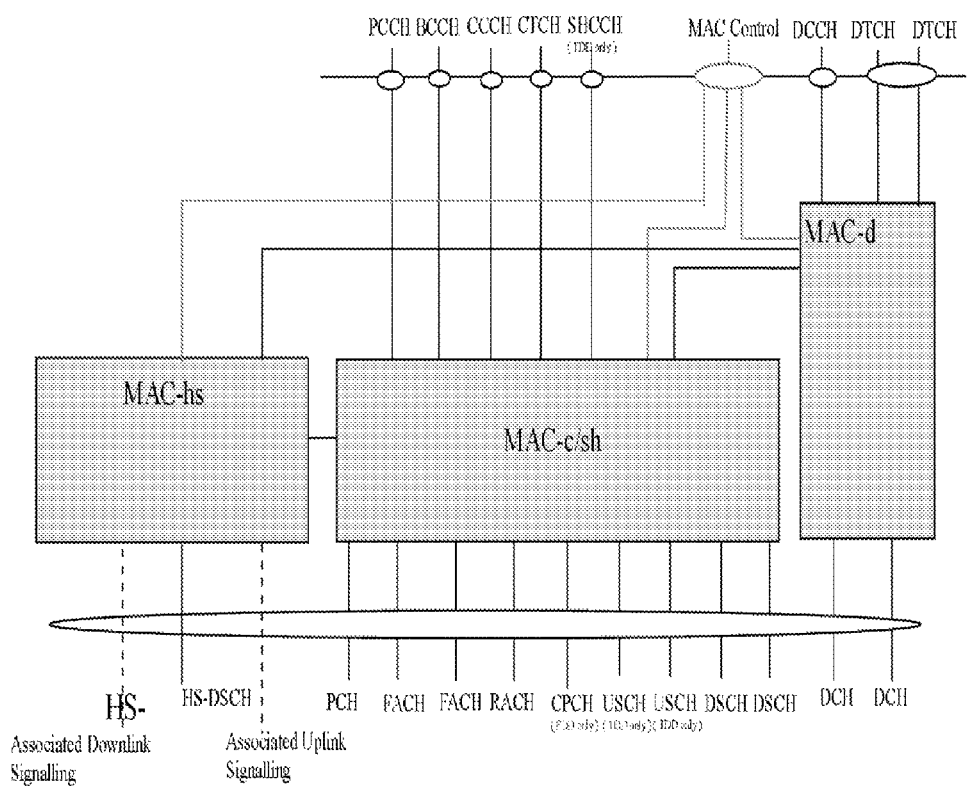
FIG. 7 is a schematic illustration of the UTRAN side overall MAC architecture, MAC-hs.
Figure 8:
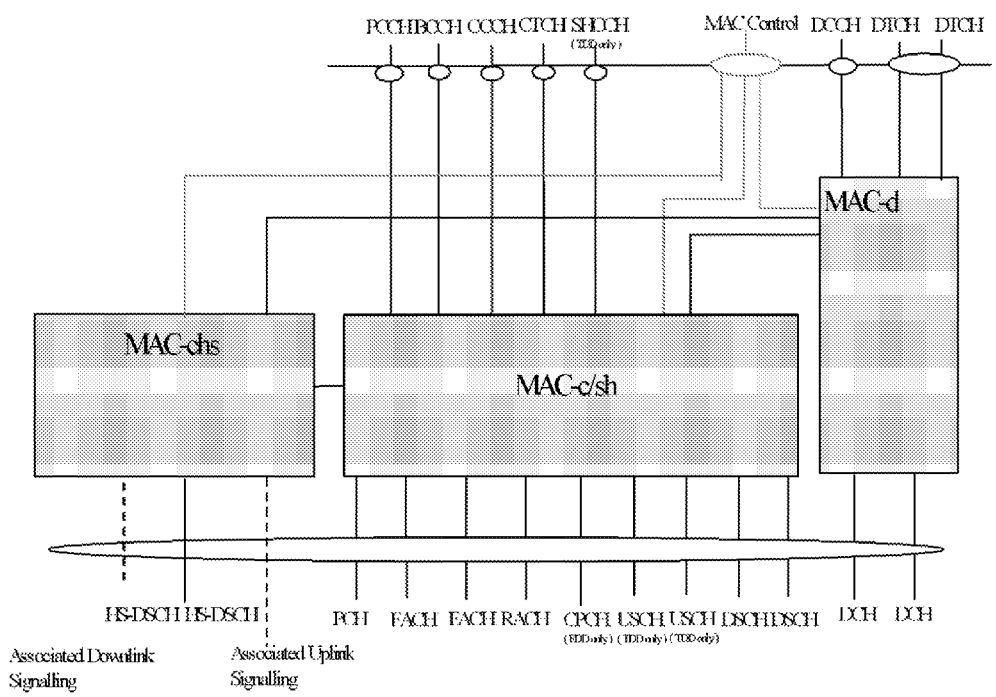
FIG. 8 is a schematic illustration of the UTRAN side overall MAC architecture, MAC-ehs.

FIGS. 1 to 11 are from 3GPP technical specifications with acronyms being defined at the end of this application. FIG. 1b and FIG. 2 illustrate examples of protocol termination for DCH and RACH/FACH, user plane. For example, the MAC layer and higher layers do not terminate in the NodeB.

With Release 5 and Release 6 and the introduction of HSDPA and EUL, respectively, part of the MAC protocol termination is moved from the RNC to the NodeB. FIG. 3a and FIG. 3b illustrates examples of protocol termination for HS-DSCH (HSDPA) and E-DCH (EUL), user plane. Here, part of the MAC protocol terminates in the NodeB and part in the Radio Network Controller, RNC.

Concerning the control plane, both RLC and RRC are terminated on the network side in the RNC, either a Serving RNC or a Controlling RNC, regardless of whether the used transport channel is DCH (FIG. 4), RACH/FACH (FIG. 5), HS-DSCH (FIG. 6a) or E-DCH (FIG. 6b).

Figure 9:
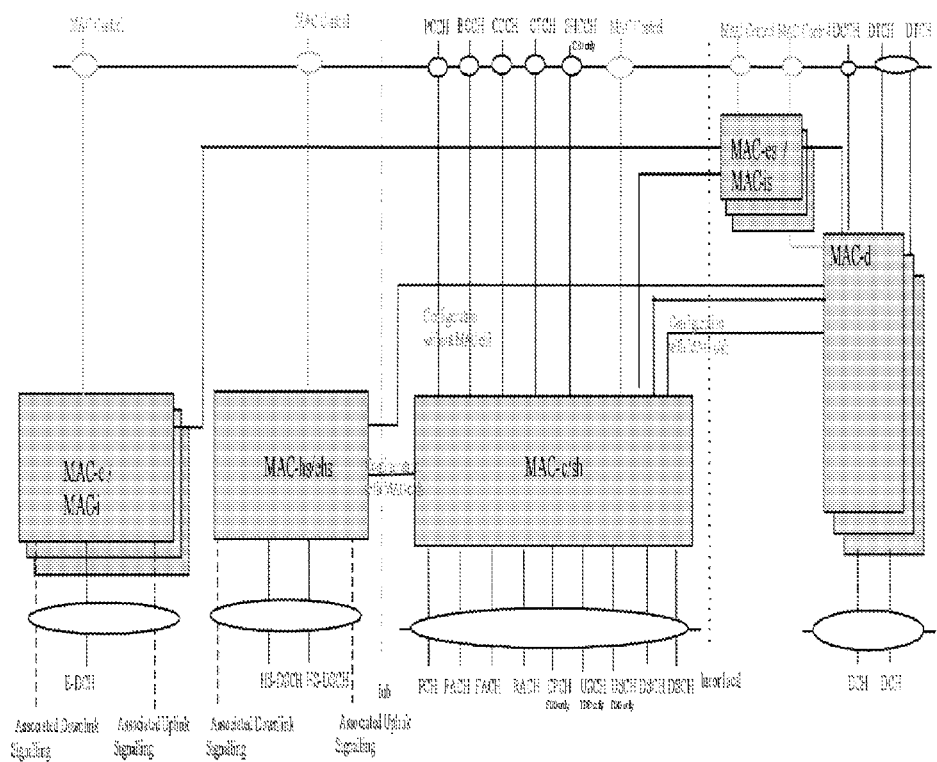
FIG. 9 illustrates uplink architecture where MAC-e/MAC-i and MAC-HS computer implemented entities are in a NodeB while MAC-es/MAC-is/MAC-chs and MAC-d computer implemented entities are in the RNC.

Focusing in on the MAC protocol architecture for the HSDPA case, there is a MAC-hs (FIG. 7) or MAC-ehs (FIG. 8) computer-implemented entity in the NodeB, whereas for the EUL case there will be a MAC-e or MAC-i computer-implemented entity in the NodeB (FIG. 9).

Figure 10:
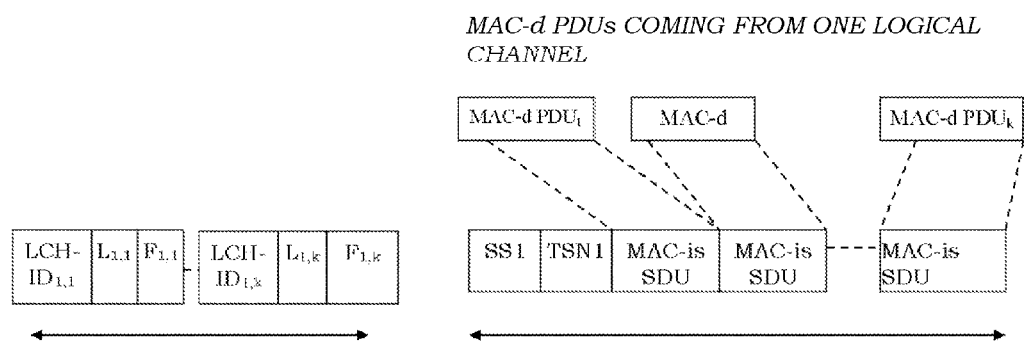
FIG. 10 is a schematic illustration of a MAC-is PDU.

FIG. 10 shows the uplink architecture where the MAC-e/MAC-I and MAC-hs computer-implemented entities are in the NodeB, and the MAC-es/ MAC-is, MAC-c/sh, and MAC-d computer-implemented entities are in the RNC. The following description focuses on the MAC-i computer-implemented entity in the NodeB and the higher protocol layer MAC-is/ MAC-d computer-implemented entities in the RNC.

With the introduction of EUL in release 6, a new uplink MAC based signaling mechanism has been introduced that relies on the Scheduling Information, a fixed size string (18 bits), conveying the fields described below from the UE to the NodeB scheduler.

One field includes a Highest priority Logical channel ID (HLID) field that identifies the highest priority logical channel with available data. If multiple logical channels exist with the highest priority, then the one corresponding to the highest buffer occupancy will be reported. The length of the HLID is 4 bits. In case the TEBS is indicating index 0 (0 byte), the HLID indicates the value "0000". Another field is the Total E-DCH Buffer Status (TEBS) which identifies the total amount of data available across all logical channels for which reporting has been requested by the RRC and indicates the amount of data in number of bytes that is available for transmission and retransmission in RLC layer. If MAC-i/is is configured, it also includes the amount of data that is available for transmission in the MAC-i/is segmentation computer-implemented entity. When MAC is connected to an AM RLC computer-implemented entity, control PDUs to be transmitted and RLC PDUs outside the RLC transmit (Tx) window are also included in the TEBS. RLC PDUs that have been transmitted but not negatively acknowledged by the peer entity are not included in the TEBS.

The Highest priority Logical channel Buffer Status (HLBS) field indicates the amount of data available from the logical channel identified by HLID, relative to the highest value of the buffer size range reported by TEBS when the reported TEBS index is not 31, and relative to 50000 bytes when the reported TEBS index is 31. The length of HLBS is 4 bits.

The UE Power Headroom (UPH) field of a frequency indicates the ratio of the maximum UE transmission power and the corresponding DPCCH code power of that frequency defined in reference 0. The length of UPH is 5 bits. The example Scheduling Information message is represented in table 1 below.

TABLE 1

Scheduling Information format

| UPH | TEBS | HLBS | HLID |
|---|---|---|---|
| (5 bits) | (5 bits) | (4 bits) | (4 bits) |

Looking at the MAC PDU format for EUL (see reference 0, sections 9.1.5 and 9.2.4.4), Rel-8 introduces a MAC-is/i computer-implemented entity which allows a flexible PDU size and multiplexing MAC-is PDUs into the same MAC-i PDU. A receiver may use the Logical Channel ID indicator ( ) in the MAC-i header to de-multiplex the received MAC-i PDU and forward the MAC-is SDUs to their respective reordering queues. Section 9.1.5 states When MAC-i/is is configured, there are two MAC sub-layers, MAC-i and MAC-is. MAC-is sits on top of MAC-i and receives PDUs directly from MAC-d and MAC-c (FDD and 1.28 Mcps TDD only). When MAC-i/is is configured, a MAC PDU for E-DCH consists of one MAC-i header and one or more MAC-is PDUs. Each MAC-is PDU consists of one or more MAC-is SDUs belonging to the same logical channel. Each MAC-is SDU equals a complete or a segment of a MAC-d PDU or a MAC-c PDU (FDD and 1.28 Mcps TDD only). The MAC-is SDUs can have different sizes. The LCH-ID and L fields are repeated per MAC-is SDU (see sub-clause 9.2.4.4). The TSN and SS fields are repeated per MAC-is PDU (see sub-clause 9.2.4.3). Multiple MAC-is PDUs from multiple logical channels, but only one MAC-i PDU can be transmitted in a TTI per E-DCH. In case sufficient space is left in the E-DCH transport block or if Scheduling Information needs to be transmitted, an SI will be included at the end of the MAC-i PDU (see FIG. 9.1.5.4a and sub-clause 11.8.1.6 and sub-clause 11.9.1.5). For 1.28 Mcps TDD multi-carrier E-DCH operation with more than one carrier group (defined in sub-clause 9.2.6.3) configured by high layer, the sufficient space is more than 33 bits in the E-DCH transport block or if Scheduling Information needs to be transmitted, an extend SI (see FIG. 9.2.6.3.-1a) will be included at the end of the MAC-i PDU(see FIG. 9.1.5.4a and sub-clause 11.9.1.5), and if the sufficient space is more than 23 bits and less than 33 bits or only one carrier group is configured by high layer, the legacy SI(see FIG. 9.2.6.3.-1) will be included at the end of MAC-i PDU (see FIG. 9.1.5.4a and sub-clause 11.9.1.5). For FDD and in CELL_FACH state only, the UE's E-RNTI can be included in the MAC-i header. Its inclusion is signaled with a reserved LCH-ID value.

Figure 11:
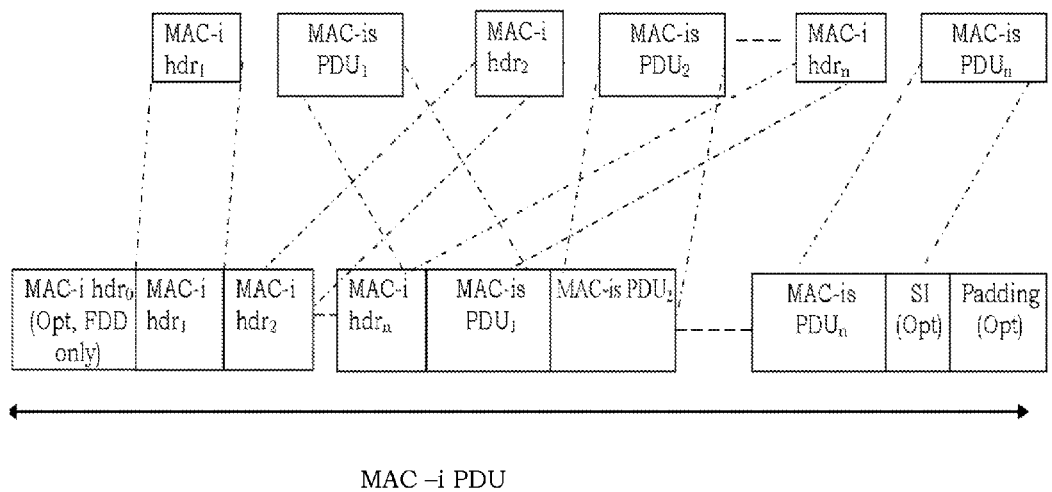
FIG. 11 is a schematic illustration of a MAC-i PDU.

FIG. 10 and FIG. 11 depict a MAC-is PDU and a MAC-i PDU, respectively. Going down the protocol stack, the MAC-I computer-implemented entity encapsulates the MAC-is PDU in a MAC-i PDU payload and adds a MAC-i PDU header.

The Logical channel identifier (LCH-ID) field provides identification of the logical channel at the receiver and the re-ordering buffer destination of a MAC-is SDU. In FDD, one LCH-ID value is reserved to indicate that the UE's E-RNTI is included in the MAC-i header. The length of the LCH-ID is 4 bits. In table 2 and 3 given below is the structure of the LCH-ID schematically illustrated.

TABLE 2

Structure of the LCH-ID field (FDD only)

| LCH-ID Field | Designation |
|---|---|
| 0000 | Logical channel 1 |
| 0001 | Logical channel 2 |
| ... | ... |
| 1101 | Logical channel 14 |
| 1110 | Identification of CCCH (SRB0) |
| 1111 | Identification of E-RNTI being included. |

TABLE 3

Structure of the LCH-ID field (1.28 Mcps TDD only)

| LCH-ID Field | Designation |
|---|---|
| 0000 | Logical channel 1 |
| 0001 | Logical channel 2 |
| ... | ... |
| 1101 | Logical channel 14 |
| 1110 | Identification of CCCH (SRB0) |
| 1111 | Reserved |

Figure 12:
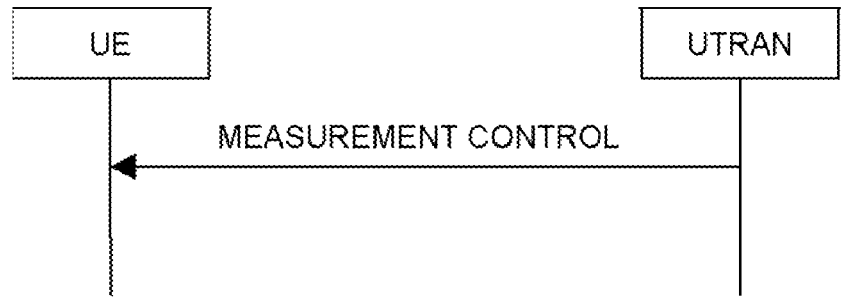
FIG. 12a is a schematic signaling diagram illustrating measurement control for a normal case.
FIG. 12b is a schematic signaling diagram illustrating measurement reporting for a normal case.
Figure 12:

Having reviewed the MAC entities and structure used in evolved HSPA, attention now turns to RRC measurement reports from the UE. The network may control a measurement in the UE by transmitting a RRC MEASUREMENT CONTROL message. See FIG. 12a for a schematic illustration.

This type of message constitutes an example of a MAC-level message. That is, a message that is processed at the MAC level of the network nodes.

The UE can transfer the measurements results (i.e. the outcome of the measurements configured by the MEASUREMENT CONTROL) to the network by means of a MEASUREMENT REPORT. See FIG. 12b for a schematic illustration.

MEASUREMENT CONTROL and MEASUREMENT REPORT are RRC messages. The RRC measurement report protocol is terminated at the network side in the Serving Radio Network Controller, Serving RNC, which suggests that a MEASUREMENT REPORT message can be decoded only by the Serving RNC and not by the NodeB. But the inventors have recognized that this is not necessarily the case. Instead MAC level messages such as a measurement report can be provided with extra structure or additional information so as to enable a recipient, e.g. a base station such as a NodeB to decode a particular message identified by means of this extra structure/added information.

In other words, the inventors have had the insight that it is possible to incorporate additional information in a MAC-level message that will enable a more efficient use of the resources in various nodes within a network. To this end, the present technology proposes a method that enables a particular node within a network to determine whether a MAC level message should be intercepted, decoded and/or processed when received. By utilizing the information incorporated by means of the proposed method a node such as a NodeB within a HSPA or HSPA+ network is enabled to work more time efficient. In this way the method will render the network itself more time efficient, which in turn improves the overall performance of the network to the benefit of the users.

Figure 21:
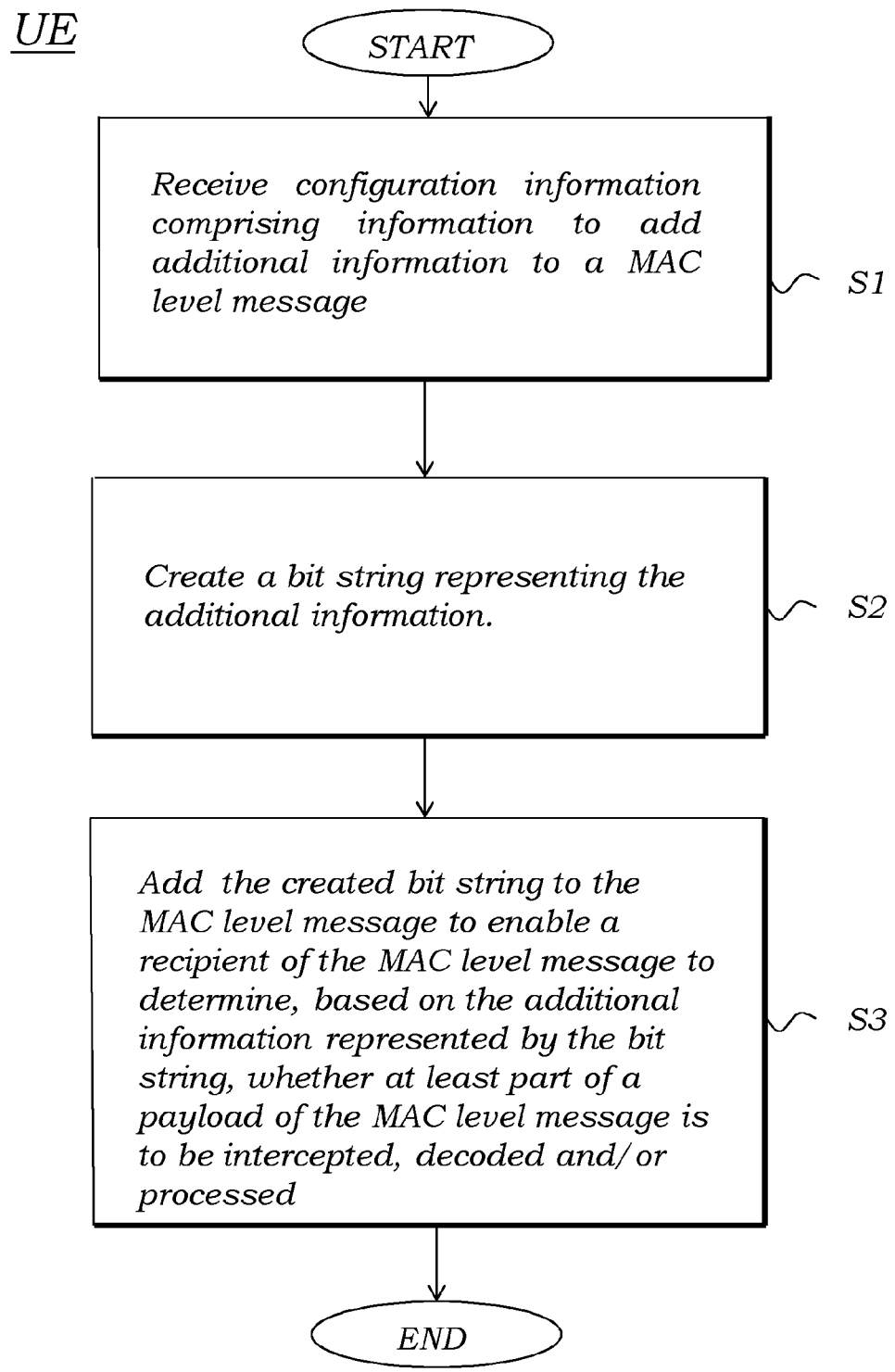
FIG. 21 is a flow diagram illustrating an exemplary embodiment of the proposed technology for the UE side

One particular way, that is schematically illustrated in the flow diagram of FIG. 21, through which this can be achieved, is by means of a method performed by a User Equipment, UE, for enabling interception, decoding and/or processing of at least part of a Media Access Control, MAC, level message. The method comprises the steps of receiving S1 configuration information comprising information to add additional information to a MAC level message and creating S2 a bit string representing the additional information. The method further comprises the step of adding S3 the created bit string to the MAC level message. In this way it enables a recipient of the MAC level message to determine, based on the additional information represented by the bit string, whether at least part of a payload of the MAC level message is to be intercepted, decoded and/or processed.

By way of example, the configuration information received in the proposed method is generated by a Radio Network Controller, RNC, and is normally transmitted to both the UE and the base station.

In one particular exemplary embodiment of the proposed method is the MAC level message a MAC PDU message with a payload. The step of creating S2 a bit string comprises the step of creating a MAC layer header comprising the additional information represented by the bit string. In other words, the bit string that comprises the additional information is created in the form of a MAC layer header that is added to the payload of the MAC PDU message. This provides for an efficient way to add further information to the MAC level message while at the same time demanding few if any changes to the overall management of the network.

In a specific exemplary embodiment according to above, the payload of the MAC PDU message comprises a MAC SDU message and the step S3 of adding comprises appending the created MAC layer header to the MAC SDU message.

In one embodiment is the MAC layer header a MAC-i header.

In a specific version of the latter embodiment is the MAC layer header a MAC-i header representing additional information identifying a Logical Channel Identity, LCH-ID.

Therefore, in a possible embodiment of the proposed method, will the additional information that is represented by the bit string, or in corresponding embodiments, the MAC layer header or the MAC-i header, comprise information that identifies the Logical Channel Identity, LCH-ID. In other words, the additional information that is added to a MAC level message will be a bit string representation of the LCH-ID identifying the Logical Channel, LCH, used in the transmission.

According to standard practice, the configuration information is generated by the Radio Network Controller, RNC, and is normally transmitted to both the UE and the base station. The base station will know that an identification of a specifically stated LCH-ID provides an indication that the corresponding payload is to be intercepted, decoded and/or processed. Thus by incorporating information identifying the LCH-ID into the bit string, for example, in the form of a MAC-layer header or a MAC-i header, the base station is provided with added information that enables it to determine if it should intercept, decode and/or process the payload upon decoding the bit string.

Thus, when the MAC-level message is transmitted to a node within a network the receiving node will decode the added string bit and identify the Logical Channel Identity, LCH-ID, and if the result of this corresponds to a predetermined LCH-ID the receiving node is instructed to intercept, decode and/or process the payload of the MAC level message.

A more detailed description of the above mentioned embodiments will be given below in relation to FIGS. 13-18.

In summary, the method according to what is stated above provides a means that enables a receiving node to intercept, decode and/or process a MAC level message when such an action is deemed favorable from the point view of either a User Equipment, UE, implementing the method or by a Radio Network Controller, RNC, instructing a User Equipment, UE, to implement such a method.

In a version of an exemplary embodiment of the proposed method is the MAC level message an 18 bit message comprising a four bit Highest Logical Channel, HLID, field, where at least part of the remaining bits comprises the payload. In this version the step S2 of creating a bit string comprises creating a four bit long bit string representing the additional information and the step S3 of adding the bit string comprises inserting the bit string into the Highest Logical Channel ID, HLID, field carried by said 18-bit message.

In a more detailed description that follows, this 18 bit message will be referred to as an Extended Scheduling Information message, ESI message to distinguish it from a regular Scheduling Information, SI, message. In other words, a regular 18 bit SI message will be distinguished from the ESI message by inserting additional information in the form of a four bit long bit string into the SI message. This four bit long bit string might be added to the positions of the corresponding HLID field of the regular SI message.

In an exemplary embodiment of the above proposed method will the step S2 of creating a bit string comprise creating a four bit long bit string representing additional information identifying a Logical Channel Identity, LCH-ID.

According to standard practice will the configuration information generated by the Radio Network Controller, RNC, normally be transmitted to both the UE and the base station. The base station will know that an identification of a specific LCH-ID provides a clear indication that the remaining parts of the message is to be intercepted, decoded and/or processed. Thus by creating a four bit long string that carries information identifying the LCH-ID and add this additional information to the message the base station will know if it should intercept, decode and/or process at least parts of the remaining message by extracting the information carried by the four bit long string identifying the LCH-ID.

In a possible example of the embodiments according to the above given is the LCH-ID that is used an LCH-ID that is not used by any of the scheduled flows. In this way the additional information can be carried by such an 18-bit message without disrupting the other ongoing processes that utilizes various scheduled LCH-IDs.

In slightly different wording, the alternative version, whose exemplified embodiments where described above, uses, instead of a MAC layer header, an 18 bit long message. The proposed method comprises steps for creating a four bit long string representing the additional information. This created bit string may then be inserted into the HLID field of the 18 bit long message. The remaining bits of the created message are then free be used to carry other information such as, for example, payload. This message, comprising a four bit long string representing additional information and up to 14 bits of payload can then be transmitted to a recipient. By providing a message in this form it is possible for the receiving node within the network to decode the four bit field that carries the information provided by the bit string inserted into the HLID-field and determine, based on the information of the bit string, whether the payload should be intercepted, decoded and/or processed.

All of the embodiments described above where the MAC level message is either a MAC layer header with a MAC PDU, comprising a MAC SDU, or the described 18-bit message, can be used in an exemplary useful application where the corresponding MAC level messages are used in for measurement reports. That is, there is provided a method wherein the MAC level message is a UE measurement report and wherein the configuration information received in step S1 comprises information on how to configure the measurement and the measurement reporting.

In still another practically useful example the method may further comprise the step of configuring the UE measurement and measurement reporting upon receipt of the configuration information.

With reference to all earlier described embodiments it is provided a method where the step S3 of adding a bit string such is performed to enable interception, decoding and processing of at least part of a MAC level message.

In a particular example of the earlier given embodiments, the configuration information may also comprise information about the type of MAC level message to transmit. In this way the base station is provided with information that allows it to quickly interpret what type of message it receives, for example distinguishing an ESI-message as described earlier from a regular Scheduling Information message, SI-message.

A more detailed description of the above given embodiments will be provided later in the description where reference will be made to FIGS. 13-18.

Figure 22:
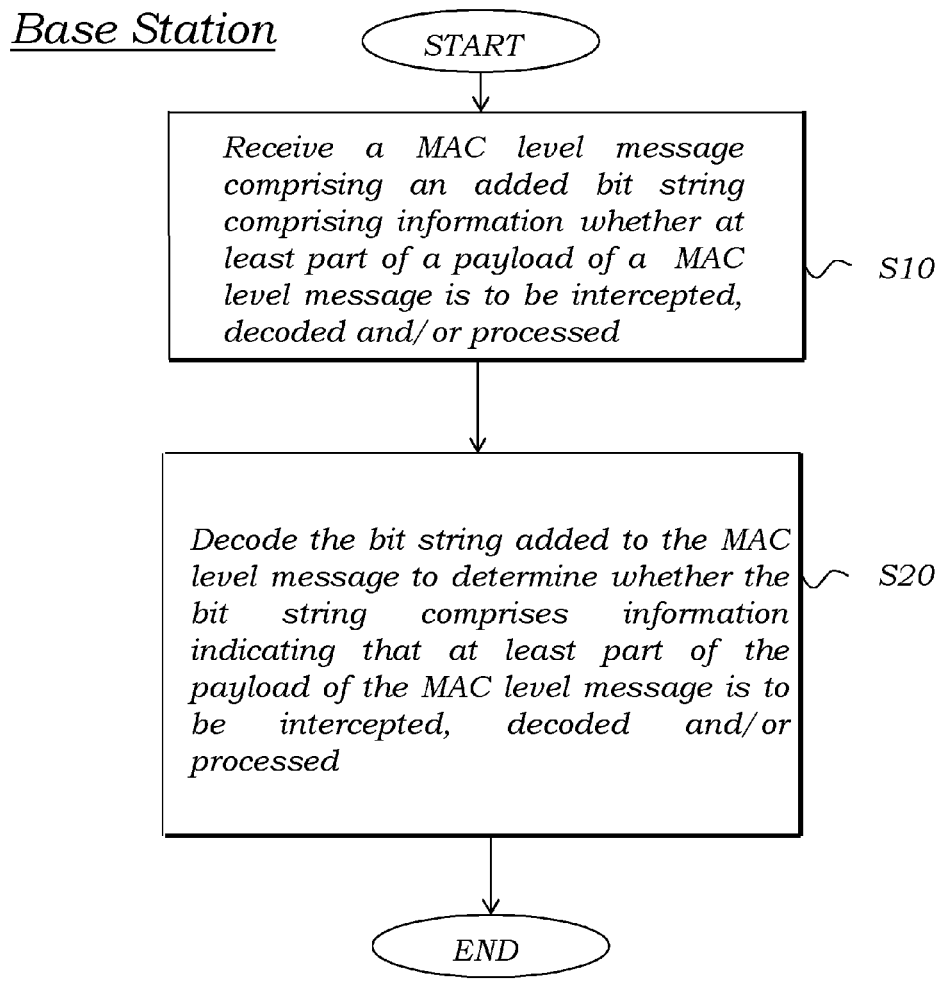
FIG. 22 is a flow diagram illustrating an exemplary embodiment of the proposed technology for the base station side

The proposed technology also relates to a method performed by a base station for determining whether at least part of a Media Access Control, MAC, level message, is to be intercepted, decoded and/or processed. The method comprises the steps of receiving S10 a MAC level message comprising an added bit string comprising information whether at least part of a payload of the MAC level message is to be intercepted, decoded and/or processed, and decoding S20 the bit string added to the MAC level message to determine whether the bit string comprises information indicating that at least part of the payload of a MAC level message is to be intercepted, decoded and/or processed. The method is schematically illustrated in the flow diagram of FIG. 22.

In a specific exemplary embodiment of the proposed method, the MAC level message will be a MAC PDU message with a payload and the added bit string will be a MAC layer header.

In still another example of an embodiment, the payload of said MAC PDU message will comprise a MAC SDU message with an added MAC layer header, and the step S20 of decoding is performed on the added MAC layer header.

In a particular version of the above given embodiments is the MAC layer header a MAC-i header.

The above given exemplary embodiments can be combined so that the information carried by the bit string, indicating that at least part of the payload of the MAC level message is to be intercepted, decoded and/or processed, comprises information identifying a Logical Channel Identity, LCH-ID.

In an alternative version of the method for determining whether at least part of a Media Access Control, MAC, level message, is to be intercepted, decoded and/or processed, is the MAC level message an 18 bit message comprising a four bit Highest Logical Channel, HLID, field and where at least part of the remaining bits comprises the payload. Here the step S20 of decoding the bit string comprises decoding a four bit long bit string inserted into the Highest Logical Channel, HLID, field to determine whether said bit string comprises information indicating that at least part of the payload of said 18 bit message is to be intercepted, decoded and/or processed.

In an exemplary embodiment of the latter version is the step S20 of decoding the four bit long bit string inserted into the Highest Logical Channel, HLID, field, performed to identify a Logical Channel Identity, LCH-ID.

In an exemplary embodiment is the LCH-ID according to the embodiments above an LCH-ID that is not used by any of the scheduled flows. In this way one obtains a method that does not interfere with other flows in the communication.

In a useful application of the proposed method is the MAC level message a UE measurement report.

All the given exemplary embodiments of the method can be combined with a version where the step S20 of decoding the bit string is performed for enabling interception, decoding and processing of at least part of a payload of the MAC level message.

The proposed technology as described with reference to all earlier embodiments is useful for determining if a payload of a MAC level message shall be intercepted. That is, it is provided a means for determining whether parts of a MAC level message, such as a payload, is to be decoded and processed after being intercepted. There might be cases where parts of the message is only decoded or processed and other parts where it is both decoded and processed.

As was mentioned earlier and will be explained in more detail in what follows, one particular version of the proposed technology relates to a network node, e.g., an RNC, that provides configuration information for a UE to add additional information to, for example, a MAC layer header, which normally read by base stations, appended to, for example, a MAC Packet Data Unit (PDU) payload, which is normally not read by base stations, to indicate whether the base station should intercept, decode, and process some or all of the MAC PDU payload. The UE that adds additional information to a MAC layer header, normally read by base stations, appended to a MAC PDU payload, which is normally not read by base stations, to indicate whether the base station should intercept, decode, and process some, or all, of the MAC PDU payload. A non-limiting example of such a MAC PDU payload is a UE measurement report. A base station (e.g., a Node B) receives a MAC PDU from a UE. The base station decodes a MAC layer header for the MAC PDU, which normally read by base stations, appended to a MAC PDU payload, which is normally not read by base stations, to determine whether the MAC layer header includes information indicating whether the base station should intercept, decode, and process some, or all, of the MAC PDU payload. After intercepting a packet, the base station may decode the MAC PDU payload, perform one or more processing operations on the MAC PDU payload, and terminate the MAC protocol. Alternatively, the base station may decode the MAC PDU payload, but not terminate the MAC protocol and pass the processed MAC PDU to another network node for further processing, e.g., by an RNC.

Having described the various features of the methods in the sections given above we will now proceed and describe this particular application of the proposed methods. This application takes the form of a method that enables a User Equipment, UE, to tag a RRC Measurement Report for interception and processing by the NodeB. Although the example describes tagging Measurement Reports, other higher protocol layer messages that the NodeB does not normally decode and/or for which the NodeB does not terminate a protocol layer may similarly be tagged. This allows new substantive communication between the UE and the NodeB in the form of new messages, message formats, and protocol enhancements without requiring significant changes to the standard. The new example communication is referred here as an enhanced measurement report.

Currently in evolved HSPA, UE measurements are configured via RRC Measurement Control messages, and measurement results are reported via Measurement Report messages according to the 3GPP procedures as illustrated above. The Measurement Reports are carried by one of the Signaling Radio Bearers (SRB), and the NodeB is made aware (via Iub signaling) of the Logical Channel Identifier (LCH-ID) used for the SRB. When a Measurement Report is sent from the UE to the RNC, the NodeB is supposed to forward the message transparently to the RNC, i.e., without decoding or processing the payload measurement report. But instead, the NodeB is enabled to intercept and decode the message without terminating the protocol. Non-limiting examples described below use the LCH-ID as an example tag that allows the NodeB to identify and intercept Measurement Reports from among all RRC messages the Node B receives. Of course, other tagging information may be used.

Starting from 3GPP Rel-8, UE data as well as control data such as RRC Measurement Reports are transmitted from the UE to the NodeB using the MAC-i/is protocol. The data PDUs coming from a logical channel are carried in MAC-is SDUs with a MAC-i header that contains the following fields as shown above in FIG. 14: LCH-ID-Logical Channel Identity of the MAC-is SDU, L-length of the MAC-is SDU, F-a flag bit indicating the segmentation status of the MAC-is SDU. Various non-limiting examples are now described in this context for marking a MAC-is SDU that the NodeB may want to intercept. These examples and embodiments are primarily intended to facilitate a concrete understanding of the underlying concept provided by the proposed technology and the embodiments and examples as such are in no way to be construed as necessary or essential constraints on the proposed technology.

In this particular application a network node, e.g., an RNC, that provides configuration information for a UE to add additional information to a MAC layer header, which is normally read by base stations, appended to a MAC packet data unit (PDU) payload, which is normally not read by base stations, to indicate whether the base station should intercept, decode, and process some or all of the MAC PDU payload.

Another aspect of this particular part of the technology relates to a UE that adds additional information to a MAC layer header, which is normally read by base stations, appended to a MAC PDU payload which is normally not read by base stations, to indicate whether the base station should intercept, decode, and process some or all of the MAC PDU payload. A non-limiting example MAC PDU payload is a UE measurement report.

Yet another aspect of this application of the technology relates to a base station (e.g., a Node B) that receives a MAC PDU from a UE. The base station decodes a MAC layer header for the MAC PDU, which normally read by base stations, appended to a MAC PDU payload, which is normally not read by base stations, to determine whether the MAC layer header includes information indicating whether the base station should intercept, decode, and process some, or all, of the MAC PDU payload. After intercepting a packet, the base station may decode the MAC PDU payload, perform one or more processing operations on the MAC PDU payload, and terminate the MAC protocol. Alternatively, the base station may decode the MAC PDU payload, but not terminate the MAC protocol and pass the processed MAC PDU to another network node for further processing, e.g., by an RNC.

A first example embodiment referred to as Extra MAC-i header is now described below with reference made to with FIG. 13. Before we provide specifics we will shortly describe, by way of example, the overall structure of the proposed technology. The Radio Network Controller, RNC, will normally configure new reports and instruct the UE on how to send these reports and what the reports shall contain by means of configuration information. The configuration information from the RNC will normally also specify how the reports are to be identified. By common procedures, the RNC will moreover provide the NodeB with the same configuration information on how the identification is to be done. After receiving configuration information the UE will proceed according to earlier described methods. The NodeB will wait until it receives the MAC level message and will then decode the added bit string to determine whether the added information represented by the bit string indicates that the payload of the message should be intercepted decoded or processed.

Figure 13:
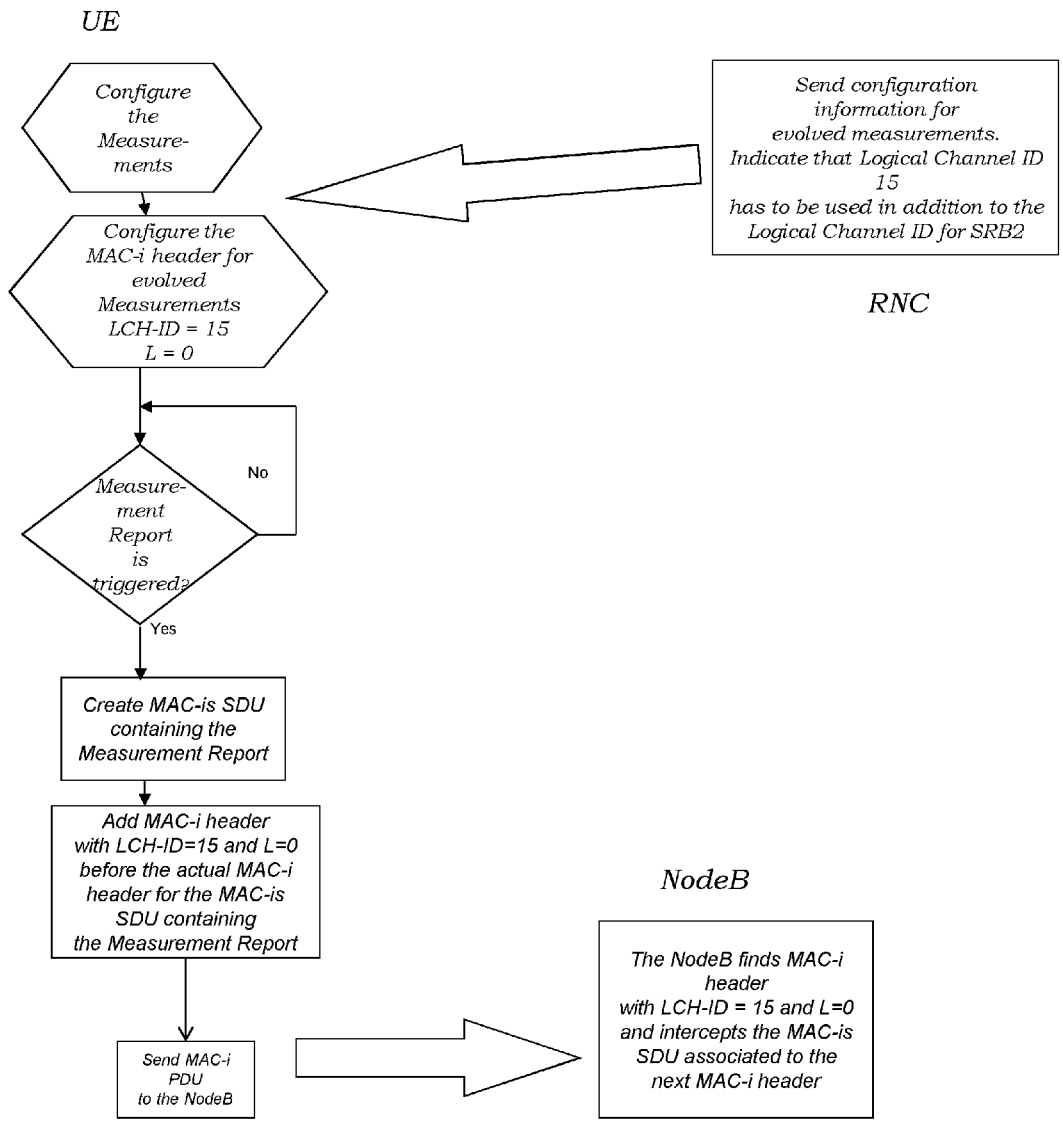
FIG. 13 is a schematic illustration of an embodiment of a particular application according to the proposed technology.

Now, in the embodiment related to FIG. 13, the RNC will at a first instance send configuration information to a User Equipment within the network. This configuration information contains, among possible other information, configuration information for evolved measurements. Within the transmitted configuration information resides an indication that a particular Logical Channel ID, LCH-ID, is to be used in addition to the LCH-ID for a SRB 2. In the particular example according to FIG. 13, LCH-ID=15 is indicated.

At a second instance the UE will receive the transmitted configuration information and based on the content of the configuration information configure a measurement and a MAC-i header for evolved measurement. The LCH-ID is set to 15 according to the indication from the RNC. Moreover, in this particular example L is set to L=0.

If the measurement report is triggered, the UE will create a MAC-is SDU that contains the measurement report. If the measurement is not triggered the UE will instead wait for a subsequent triggering.

In a third instance, the UE will add a MAC-i header with LCH-ID=15 and L=0 before the actual MAC-i header for the MAC-is SDU that contains the measurement report.

In a fourth instance the MAC-i PDU, containing the MAC-i header and the SDU with its MAC-is header is sent to a NodeB.

At a fifth instance the MAC-i PDU is received by the NodeB. NodeB finds a MAC-i header with LCH-ID=15 and L=0. It therefore intercepts the MAC-is SDU associated to the next MAC-i header.

Thus, through the mechanism that the UE adds additional information to a MAC level message, here in the form of a measurement report, by means of a certain bit string, here in the form of a MAC-i header, representing the additional information, it is possible for the receiving NodeB to intercept a specifically relevant SDU without having to intercept a large number of SDUs that might be irrelevant for the NodeB.

In short summary, in addition to the regular MAC-i header, a special MAC-i header is used in this example to indicate to the NodeB that the following MAC-i header is for a MAC-is SDU carrying a Measurement Report that the NodeB may want to intercept. For example, this special MAC-i header may have the following format: LCH-ID=15 (a value currently not used), L=0 (11 bits set to 0), F=0 (or F=1).

If the intercepted Measurement report is to be forwarded to the RNC, the NodeB strips the special MAC-i header before sending it up to the RNC. This embodiment requires no changes to the RRC measurement setup and reporting procedures other than indicating in the Measurement Control message if the Measurement Reports should be tagged using the special MAC-i header.

Figure 14:
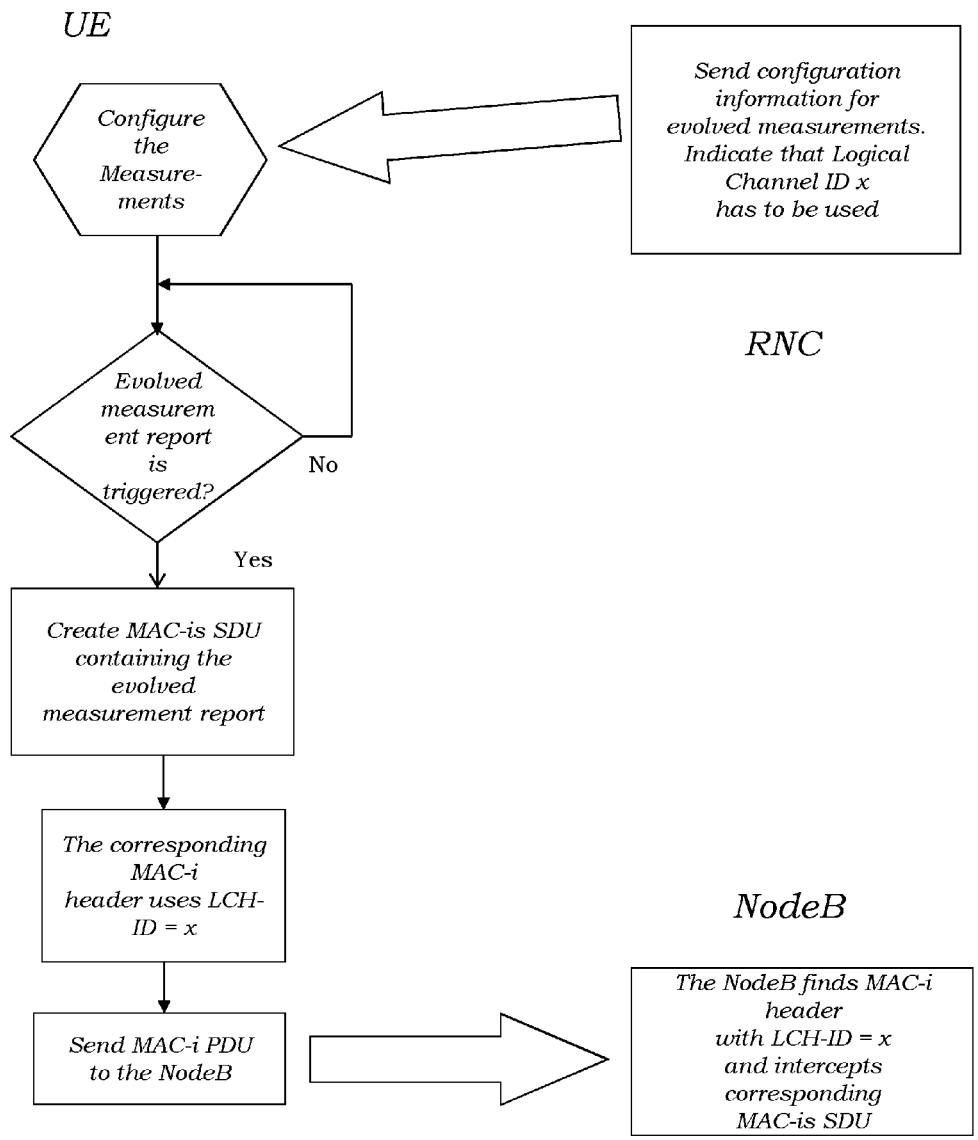
FIG. 14 is a schematic illustration of an embodiment of a particular application according to the proposed technology.

Another example embodiment referred to as MAC-level measurement reports is now described in conjunction with FIG. 14.

Here the actions are similar to the steps performed in relation to the application given in the embodiment related to FIG. 13. There are however some modifications.

At a first instance the RNC sends configuration information to a User Equipment within the network. This configuration information contains, among possible other information, configuration information for evolved measurements. Within the transmitted configuration information resides an indication that a particular Logical Channel ID, LCH-ID=X is to be used.

At a second instance the UE will receive the transmitted configuration information and based on the content of the configuration information configure a measurement. If the measurement report is triggered, the UE will create a MAC-is SDU that contains the measurement report. If the measurement is not triggered the UE will instead wait for a subsequent triggering.

In a third instance, the UE creates a MAC-is SDU that contains the evolved measurement report.

In a fourth instance the corresponding MAC-i header is created with LCH-ID=X.

After that, at a fifth instance, the MAC-i PDU is sent to a NodeB.

At a sixth instance the MAC-i PDU is received by the NodeB. NodeB finds a MAC-i header with LCH-ID=X. It therefore intercepts the corresponding MAC-is SDU.

UE measurements and reporting may be configured as part of the radio bearer setup or reconfiguration procedure using new Information Elements. These measurement reports are MAC-level control PDUs that terminate in the MAC layer in the NodeB. In other words, they are not forwarded to the RNC. The MAC-i header of this measurement reports are assigned an artificial LCH-ID that is not in use in the current connection.

This embodiment has no impact on the existing RRC measurement setup and reporting procedures but requires the specification of a new MAC control PDU for every measurement and/or report type.

Figure 15:
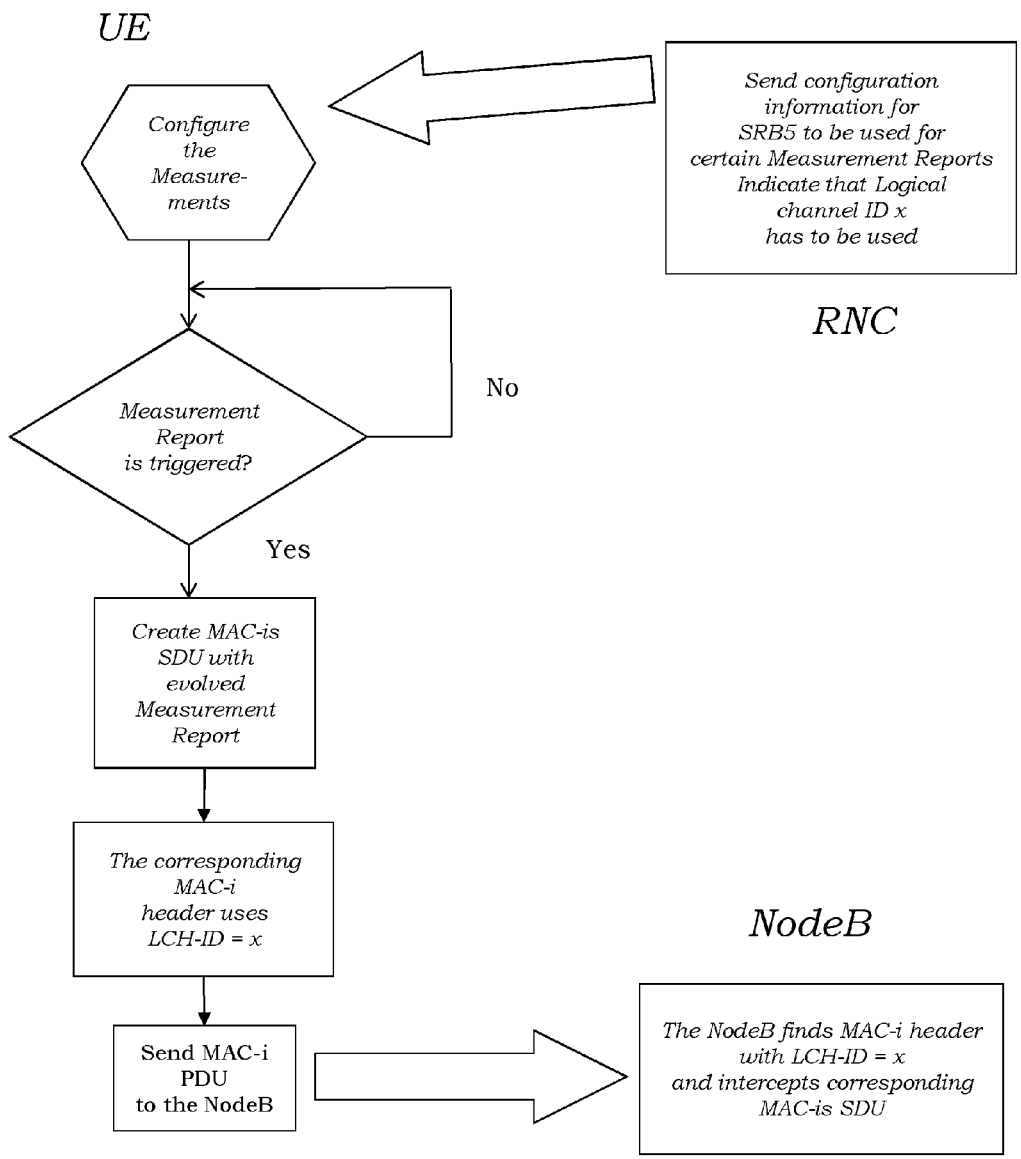
FIG. 15 is a schematic illustration of an embodiment of a particular application according to the proposed technology.
Figure 16:
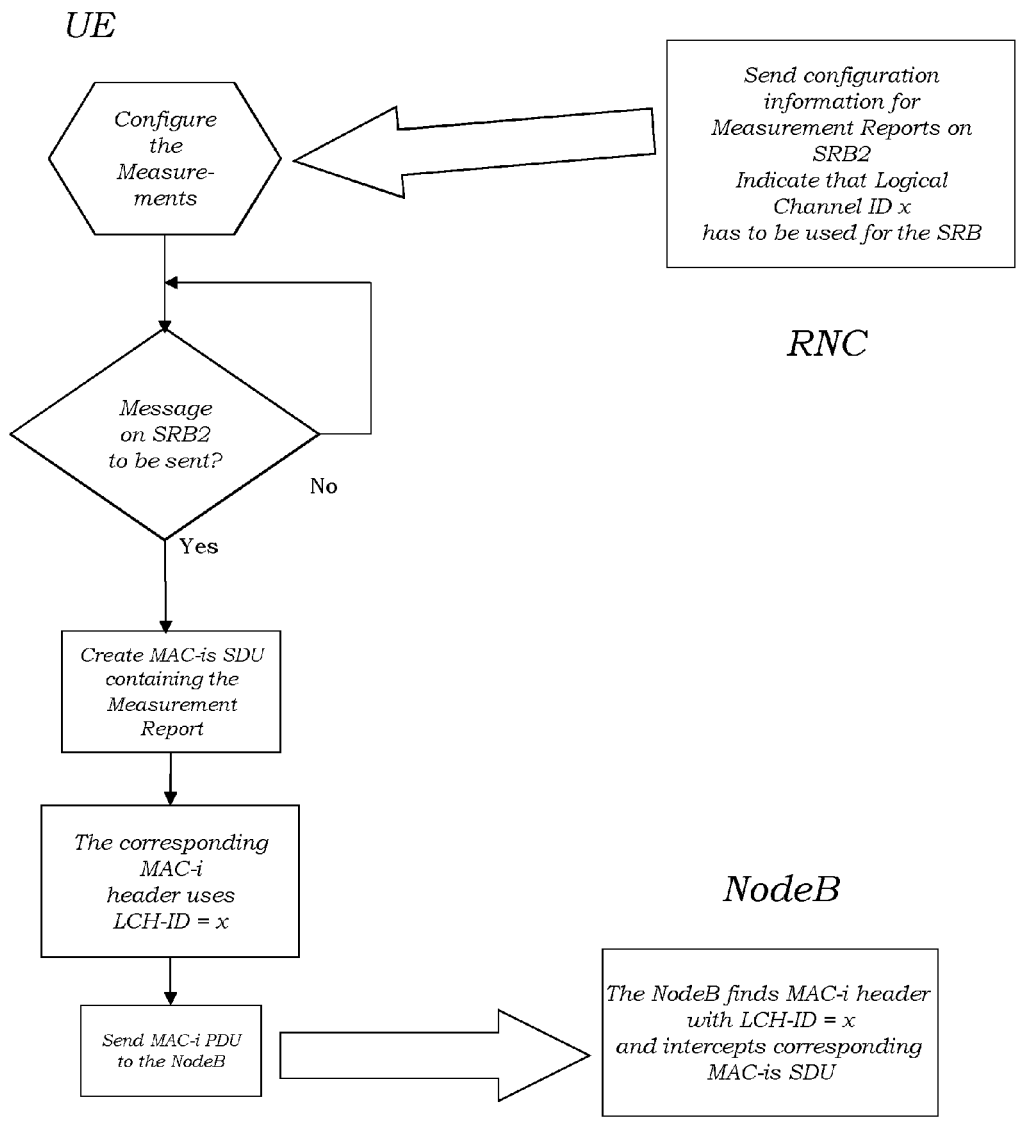
FIG. 16 is a schematic illustration of an embodiment of a particular application according to the proposed technology.
Figure 17:
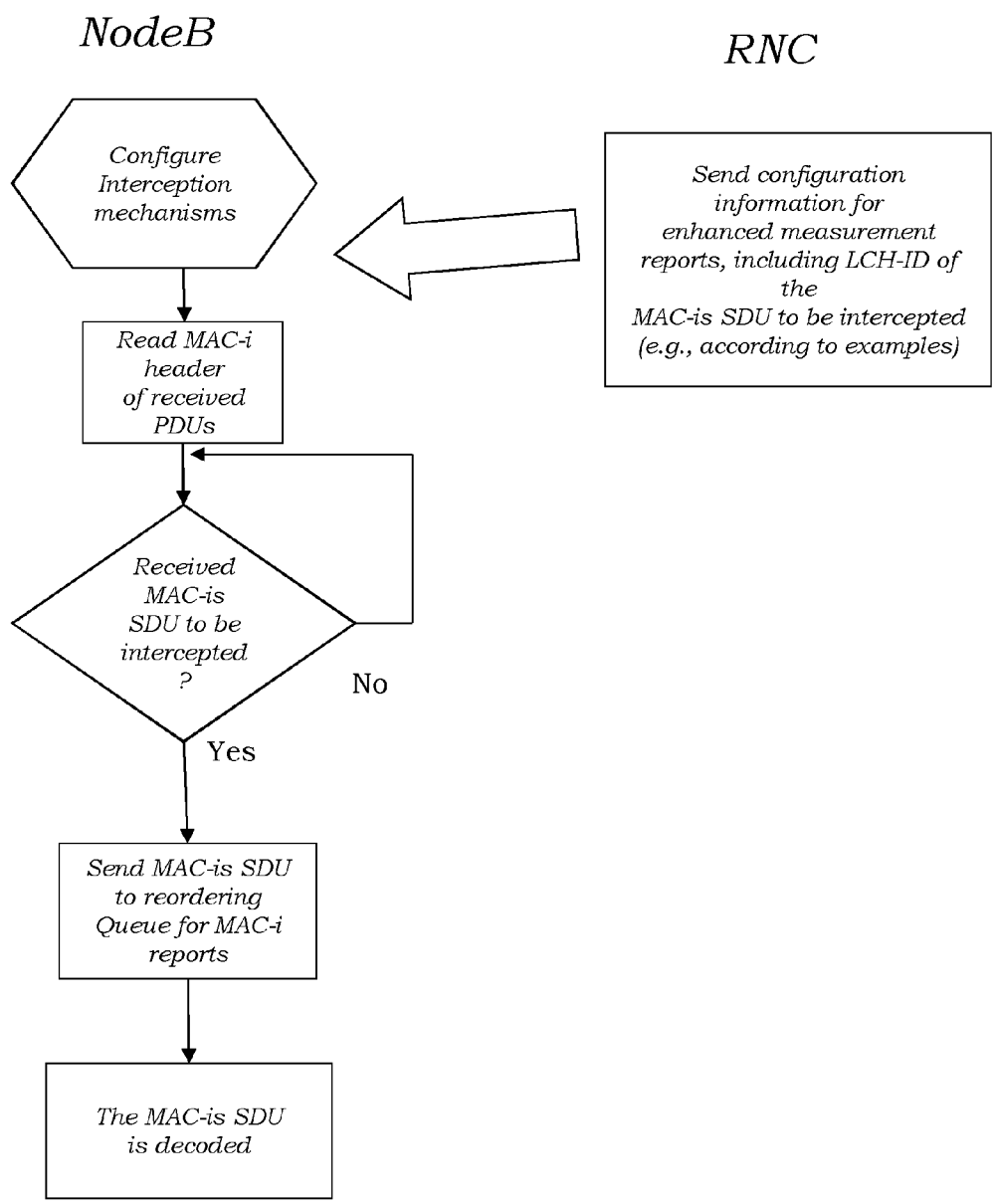
FIG. 17 is a schematic illustration of an embodiment of a particular application according to the proposed technology.

An example embodiment referred to as New SRB is now described in conjunction with FIG. 15.

At a first instance the RNC sends configuration information to a User Equipment within the network. This configuration information contains, among possible other information, information that SRB5 is to be used for the measurement reports. Within the transmitted configuration information resides an indication that a particular Logical Channel ID, LCH-ID=X is to be used.

At a second instance the UE will receive the transmitted configuration information and based on the content of the configuration information configure a measurement. If the measurement report is triggered, the UE will create a MAC-is SDU that contains the measurement report. If the measurement is not triggered the UE will instead wait for a subsequent triggering.

In a third instance, the UE creates a MAC-is SDU that contains the evolved measurement report.

In a fourth instance the corresponding MAC-i header is created with LCH-ID=X.

After that, at a fifth instance, the MAC-i PDU is sent to a NodeB.

At a sixth instance the MAC-i PDU is received by the NodeB. NodeB finds a MAC-i header with LCH-ID=X. It therefore intercepts the corresponding MAC-is SDU.

Currently, four SRB types (SRB1 to SRB4) are defined for DCCH in evolved HSPA. An additional SRB type, e.g., SRB5, can be defined for RRC Measurement Reports to be intercepted by the NodeB. A separate LCH-ID may then be assigned to SRB5 to distinguish it from the other SRBs. This above embodiment has no impact on the existing RRC measurement setup and reporting procedures other than the new SRB type. However, adding a new SRB type has significant impact on the rest of the RRC protocol. Both the Extra MAC-i header and the New SRB example embodiments allow the distinction of a subset of the RRC messages that contains only Measurement Reports that can be intercepted by the NodeB. The ASN.1 syntax for this subset may be made available to the NodeB for decoding purpose, hence avoiding the need to implement the full RRC ASN.1 syntax.

The next example embodiment intercepts the whole SRB2. This example embodiment is now described in conjunction with FIG. 16.

At a first instance the RNC sends configuration information to and to a User Equipment within the network on SRB2. This configuration information contains, among possible other information, information that Logical Channel ID, LCH-ID=X is to be used for the SRB.

At a second instance the UE will receive the transmitted configuration information and based on the content of the configuration information configure a measurement. If the measurement report is to be sent, the UE will create a MAC-is SDU that contains the measurement report. If the measurement is not to be sent the UE will instead wait for a subsequent triggering.

In a third instance, the UE creates a MAC-is SDU that contains the measurement report.

In a fourth instance the corresponding MAC-i header is created with LCH-ID=X.

After that, at a fifth instance, the MAC-i PDU is sent to a NodeB.

At a sixth instance the MAC-i PDU is received by the NodeB. NodeB finds a MAC-i header with LCH-ID=X. It therefore intercepts the corresponding MAC-is SDU.

This example is based on current (i.e., with reference to the current 3GPP specifications) association between the Signaling Radio Bearer, SRB, used to carry RRC Measurement Reports (SRB2) and a LCH-ID. The NodeB may intercept (without terminating the protocol) all the messages associated to a specific SRB (e.g. SRB2), decode them, and extract the needed information (e.g. Measurement Report) for further processing. This example embodiment has the advantage of not having any impact on the RRC protocol. But like other examples above, the NodeB needs to support a subset of the RRC ASN.1 syntax. As a result, the UE must decode all the messages carried over SRB2 (and not only the Measurement Reports) so that the required ASN.1 subset would be larger than for the first and third embodiments above.

The handling of the enhanced measurement reports is now described. For reference see FIG. 17. The actions of the UE is not illustrated in FIG. 17, these actions might be any of the actions as described earlier in relation to FIGS. 13-16.

Thus, initially the RNC sends configuration information for enhanced measurement reports. This configuration information includes the LCH-ID of the MAC-is SDU that is to be intercepted. The configuration information is handled by a UE (not shown according to any of the earlier described procedures.

After being processed and transmitted from the UE, the message is received by the NodeB.

The NodeB will configure an interception mechanism upon the arrival of the message (in this particular case a MAC PDU).

After this interception mechanism configuration the NodeB proceeds and reads the MAC-i header of the MAC PDU.

If the MAC-i header added to the MAC PDU gives an indication that the MAC-is SDU is to be intercepted the MAC-is SDU is sent to an reordering queue for MAC-i reports, after which the MAC-is SDU is decoded. In the case that the MAC-i header does not give an indication that the MAC-is SDU is to be intercepted, the MAC PDU message proceeds according to protocol.

In summary, one logical channel identifier field (LCH-ID field) of the MAC-i header can be configured by the network in order to be used for evolved measurement reports. The MAC-is SDUs associated to the evolved measurement report logical channel may be processed both at the serving NodeB (and optionally also a non-serving NodeB) and the serving RNC. In this way, the measurement information is available for both NodeB and RNC without the need of further signaling between NodeB and RNC. As an alternative, the MAC-i report may only processed by the serving NodeB.

When configured by higher layers (i.e., RRC), the UE may use the association between enhanced measurement reports (such as the examples described above) and Logical Channel Identifiers (in the MAC-i header) in order to allow the NodeB to determine which MAC-is SDU carries measurement report information.

The de-multiplexing entity in the NodeB, which for DTCH/DCCH transmission forwards the MAC-is PDUs to the associated MAC-d flow, identifies the LCH-ID associated to the enhanced measurement reports and forwards the MAC-is PDU associated to that MAC-d flow not only to the RNC, but also to a new reordering queue in the NodeB created for this purpose.

Figure 19:
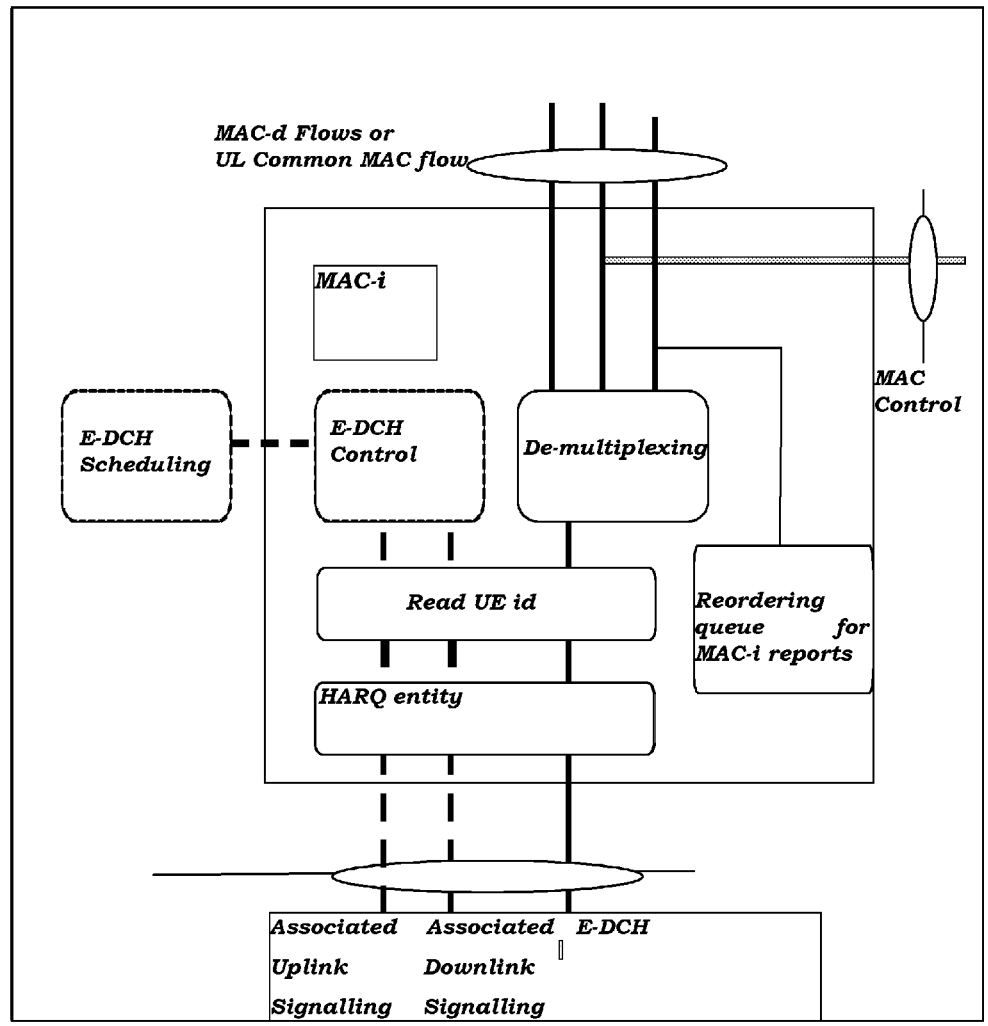
FIG. 19 is a schematic illustration of a de-multiplexing entity in a NodeB.

Alternatively, the de-multiplexing entity in the NodeB, identifies the LCH-ID associated to the enhanced measurement reports and forwards the MAC-is PDU associated to that MAC-d flow only to the new reordering queue in the NodeB created for this purpose (e.g. in case of the second example embodiment above, the MAC-is PDUs associated to a MAC level measurement report do not necessarily need to be forwarded to the RNC). Reference is here made to FIG. 19.

As described above, the Scheduling Information (SI) message sent from the UE to the NodeB scheduler is an 18-bit information that fits exactly into the lowest MAC-e and MAC-i transport format. As such, it cannot be used to transmit any information other than what is currently specified in 3GPP. But the SI message can extended to carry other information by doing the following. First, for EUL operation, a UE may be configured with a number of scheduled and non-scheduled flows identified by different Logical Channel Identifiers (LCH-ID). Usually, user data is configured on scheduled flows, and RRC signaling is configured on non-scheduled flows. Second, the 4-bit HLID field carries the LCH-ID of the highest priority scheduled flow that has data in the UE buffer. The resulting, new Extended Scheduling Information (ESI) may be defined by inserting into the HLID field a LCH-ID that does not belong to any scheduled flow. The remaining 14 bits are now free to be used for carrying other information.

Figure 18:
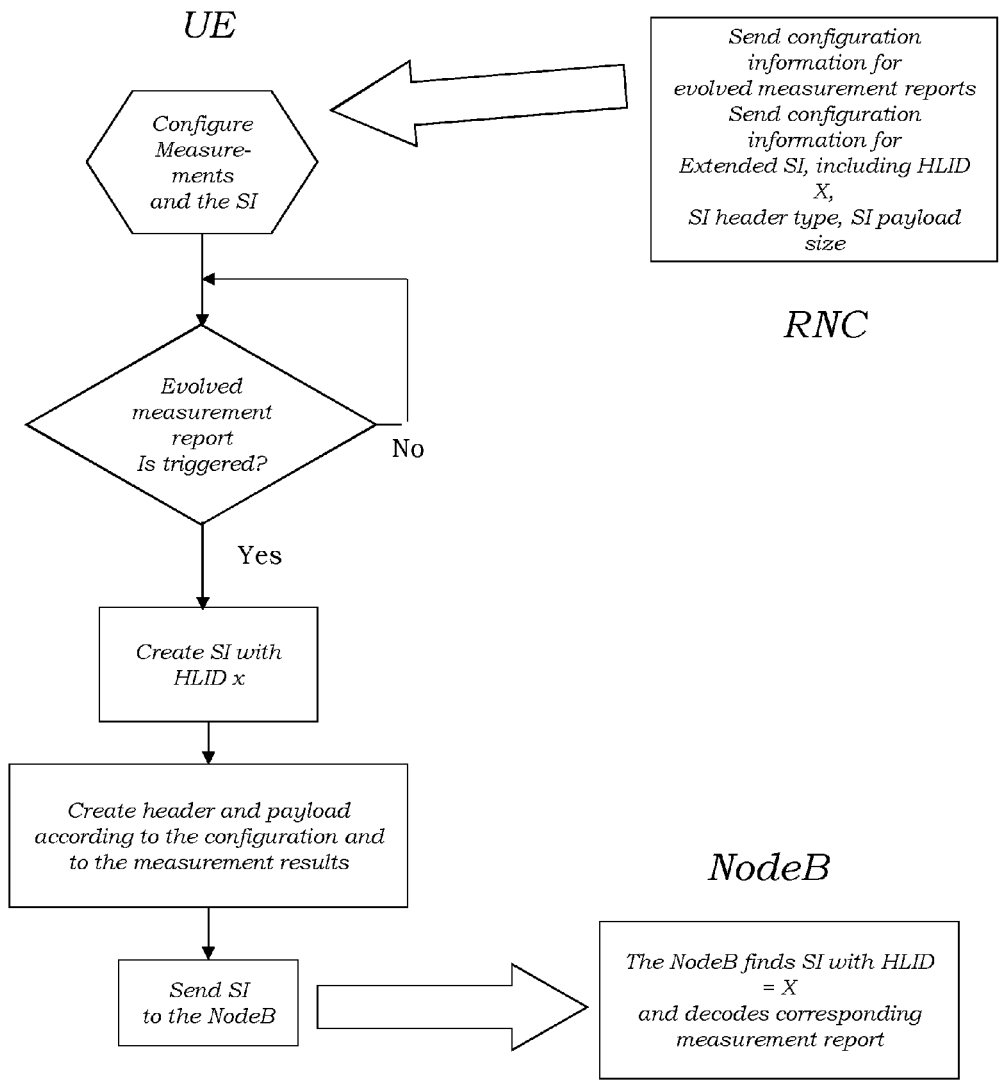
FIG. 18 is a schematic illustration of an embodiment of a particular application according to the proposed technology.

The flowchart given in FIG. 18 illustrates some example steps performed for ESI.

That is, initially the RNC sends configuration information to a UE. This configuration information contains, among other possible information, configuration information for evolved measurement reports as well as configuration information for Extended SI, ESI, including HLID X, SI header type and SI payload size.

When this configuration information is received by the UE, the UE initiates a configuration of measurements and the SI.

If an evolved measurement report is triggered the UE will create a SI message with HLID X according to what has been described earlier.

At the next instance in this application the UE will create a header and payload according to the configuration and the result of the measurement.

When this has been done, the SI is sent to a NodeB.

When NodeB receives the SI, NodeB finds an SI with HLID=X and decodes the corresponding measurement report.

An alternative version of the above given example does not utilize a header; instead only a HLID and payload are used to generate the message. In other words, the UE will create a message comprising a HLID and a payload and send to a base station, when this message is received by the base station the base station will decode the HLID to extract information whether the payload should be intercepted, decoded and/or processed.

It is seen in these specific applications how the proposed technology provides for an efficient mechanism that enables a NodeB to intercept, decode and/or process MAC level messages such as measurement reports. The mechanism provides an efficient means for the NodeB to identify those messages whose payloads shall be intercepted, decoded and/or processed.

The following are some non-limiting examples of how to use this information to define new message formats for carrying different kinds of payload.

1—A fixed number of bits may be reserved for specifying the content of the ESI. For example a 4-bit header allows the distinction of 16 different payload types for the remaining 10 bits.

2—The header may be made up of a variable number of bits. For example, the header can be made up of a number of "1" bits separated from the payload by a "0" bit, giving the following: 0+13-bit payload, 10+12-bit payload, 110+11-bit payload, etc. Each one of this format may be defined for a different type of payload.

3—The LCH-ID can be exploited again to create more possibilities. A total of 16 LCH-ID can be defined, but the number of Logical Channels for scheduled flows configured at any one time rarely exceeds 4. The remaining 12 LCH-ID may be used in conjunction with any of the above methods to greatly multiply the number of possible payload types.

To further clarify the method we provide a more detailed description of the use of a method in a UE for enabling a node, such as a NodeB, within a network to intercept, decode and/or process a MAC level message by using an 18 bit long message transmitted to the node. As has been stated earlier in the description, certain MAC level messages are not usually read by a receiving node, instead they are relayed to the Radio Network Controller. To provide a more efficient use of a node such as a NodeB within the network the UE will generate a four bit long bit string that will be inserted into a specific field of the 18 bit long message. This 18 bit long message, which we will refer to as an Extended Scheduling Information message, ESI message, contains, as has been described a number of fields. The field to which the bit string will be added is the HLID field. This field is able to carry four bits and the sizes of the HLID field and the generated bit string therefore match.

Figure 23:
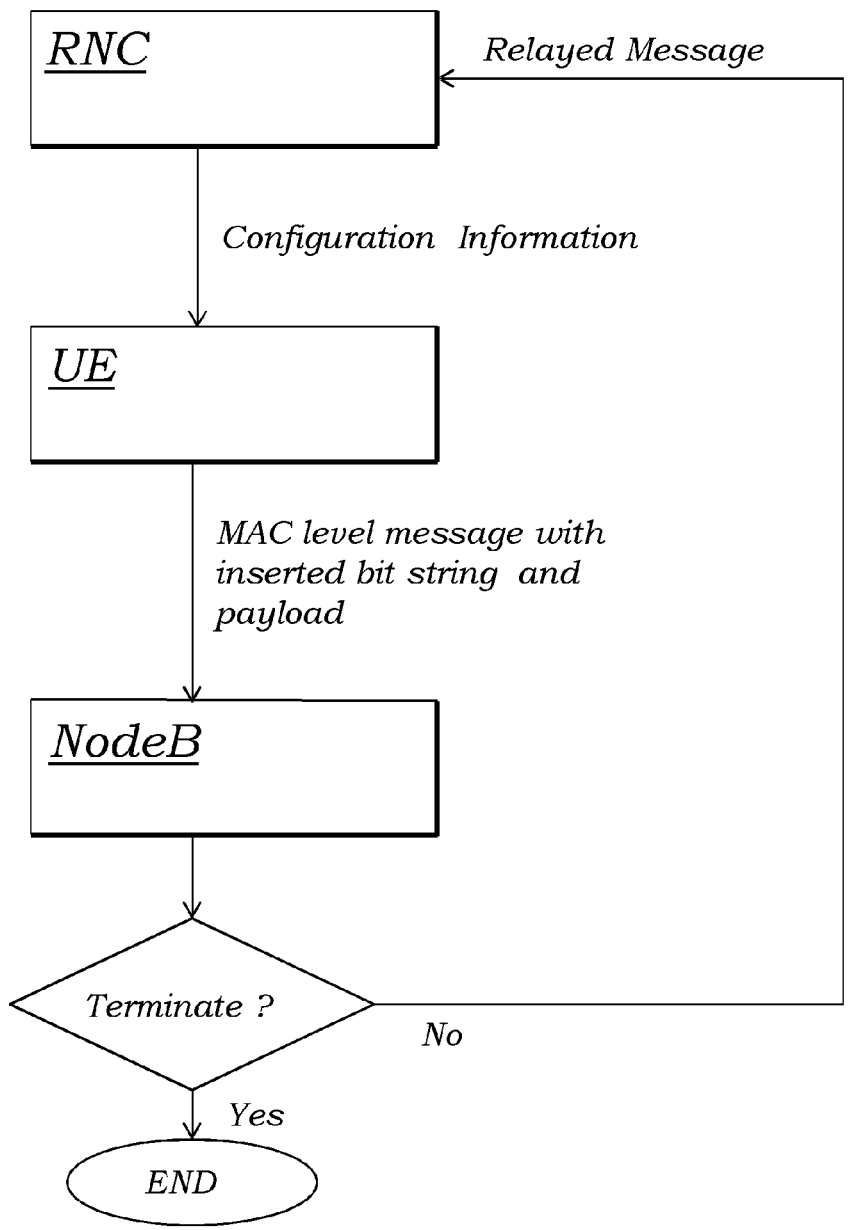
FIG. 23 is a schematic illustration of an application of the proposed technology.

To enable an appreciation of the overall structure of the proposed technology the method will be described as a single series of events. This is a possible sequence that might emerge during the use of the method, other sequences are however foreseeable. Reference is here made to FIG. 23.

Initially, a RNC generates configuration information relating to a MAC level message that shall be sent from a User Equipment to a NodeB. This configuration information comprises, among other possible information, an indication of which LCH-ID should be used for the MAC level message, for example LCH-ID=X, where X could, for example, be any of X=0, X=1, ... X=15. The RNC provides the UE with this configuration information.

On the UE side the procedure begins as has been described earlier. In a step S1, the UE receives the configuration information. Based on the content of the received information it creates a bit string, in a step S2, that will give an indication to the NodeB whether it should intercept, decode and/or process the pay load of the MAC level message. The bit string is four bits long and can for example indicate what LCH-ID the RNC transmitted in the configuration information message. The particular representation chosen is not essential, to be concrete, the message [0001] could indicate LCH-ID=2 thus representing the case where the received configuration information indicated LCH-ID=X=2. Other bit string representations of LCH-IDs are possible; here however we follow the representations tabulated in Table 2 and Table 3 given earlier. When the UE has created the bit string it proceeds to add, in a step S3, the created bit string to an 18 bit long MAC level message. This is done, in the present embodiment, by means of inserting the created bit string into the HLID field of the 18 bit long message. At least parts of the remaining 14 bits of the message can now be used to carry the payload of the message. It will therefore be transmitted to a NodeB a 18 bit message that comprises a four bit long bit string inserted into the HLID field and a payload that comprises at least part of the remaining 14 bits in the message.

As has been stated earlier, the configuration information that the UE receives from the Radio Network Controller, RNC, might in addition also comprise information about the type of MAC level message that is to be transmitted, for example, a measurement report.

On the NodeB side, the NodeB will receive, in a step S10, the 18 bit long message containing the payload. The NodeB will now decode, in a step S20, the bit string inserted into the HLID field of the 18 bit long message and thereby determine the information carried by the bit string inserted to the HLID field. If this HLID field carries information about a particular LCH-ID the NodeB will intercept, decode and/or process the corresponding payload, that is, at least parts of the remaining 14 bits of the 18 bit message that are used to carry information.

After having intercepted, decoded and/or processed the bit string and possible the payload, the NodeB might either terminate the protocol or relay the message to the RNC. This is schematically illustrated in FIG. 23.

The payload type to be used for a specific UE may be configured dynamically by RRC. Thus, different payload types can be specified using the same header bits or LCH-ID as long as they will not be used at the same time. This combined with the example described above provides an almost unlimited number of payload types.

Figure 20:
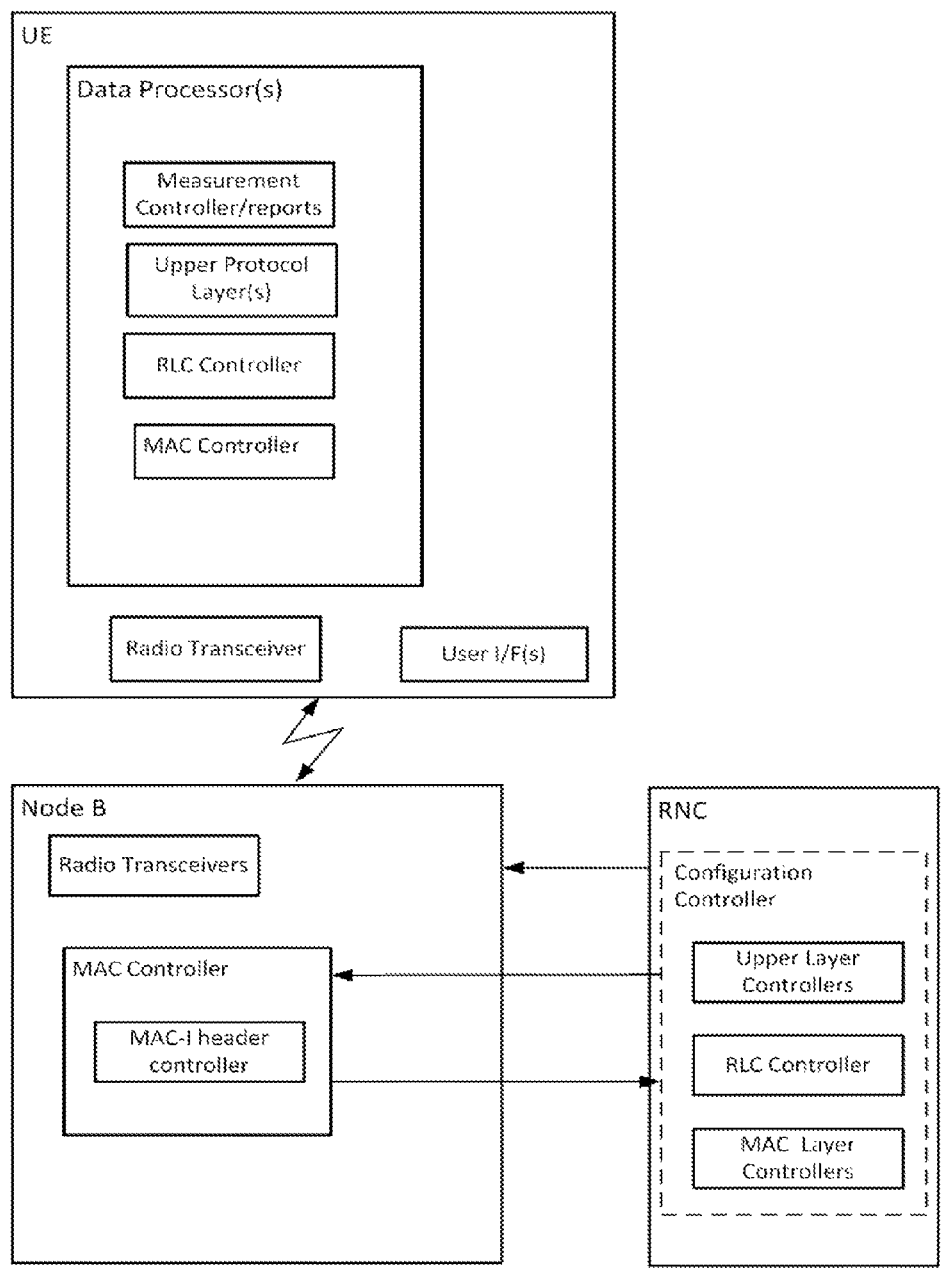
FIG. 20 is a schematic block diagram illustrating a UE, a NodeB and a RNC.

FIG. 20 shows a non-limiting example function block diagrams of a UE, NodeB, and RNC that may be used to implement the technology described above. A line surrounds several function blocks in each of the UE, NodeB, and RNC to represent a machine platform in each node. The terminology "machine platform" is a way of describing how at least some of the functional units may be implemented or realized by machine. The machine platforms may take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transitory computer-readable storage media. In such a computer implementation, a machine platform may comprise, in addition to a processor (s), a memory section (which in turn can comprise random access memory, read only memory, an application memory (a non-transitory computer readable medium which stores, e.g., coded non instructions which can be executed by the processor to perform acts described herein), and any other memory such as cache memory, for example). Another example platform suitable is that of a hardware circuit, e.g., an application specific integrated circuit (ASIC), a digital signal processor (DSP), a programmable gate array (PGA), etc., where circuit elements are structured and operated to perform the various acts described herein.

Figure 24:
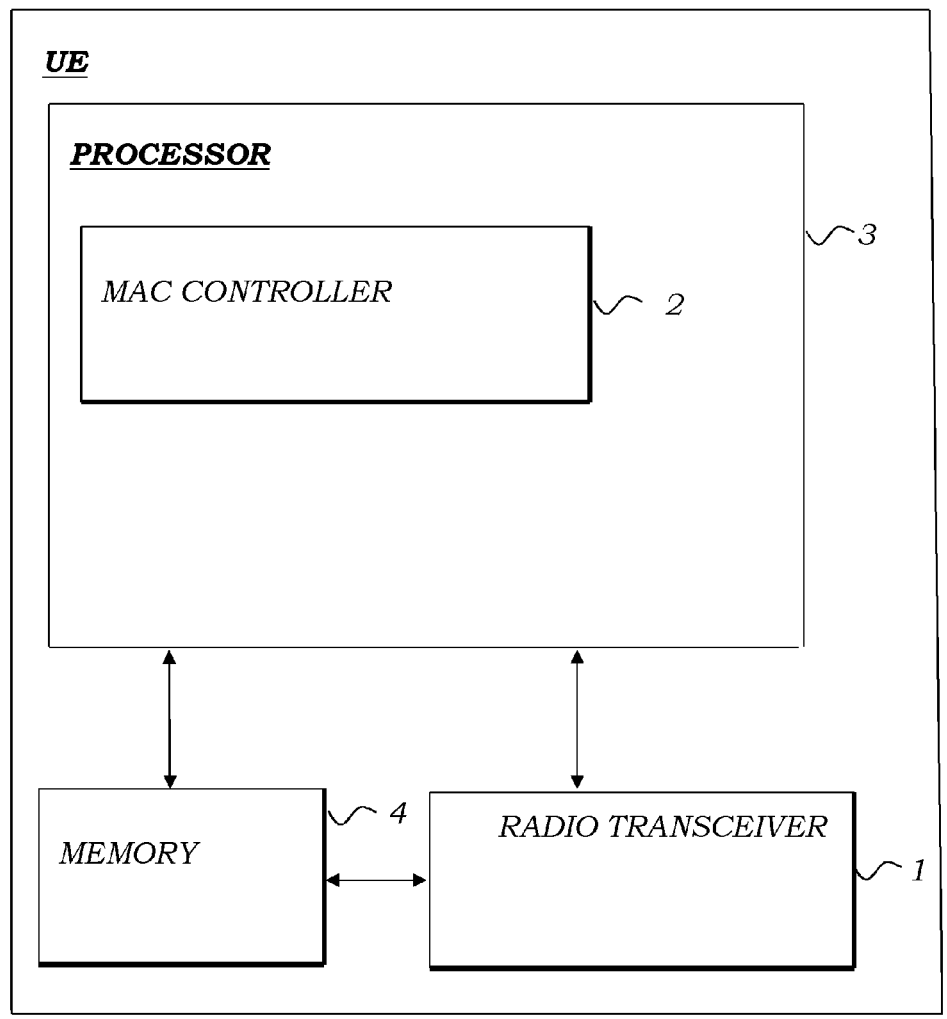
FIG. 24 is a schematic illustration of an exemplary UE according to the proposed technology.
Figure 25:
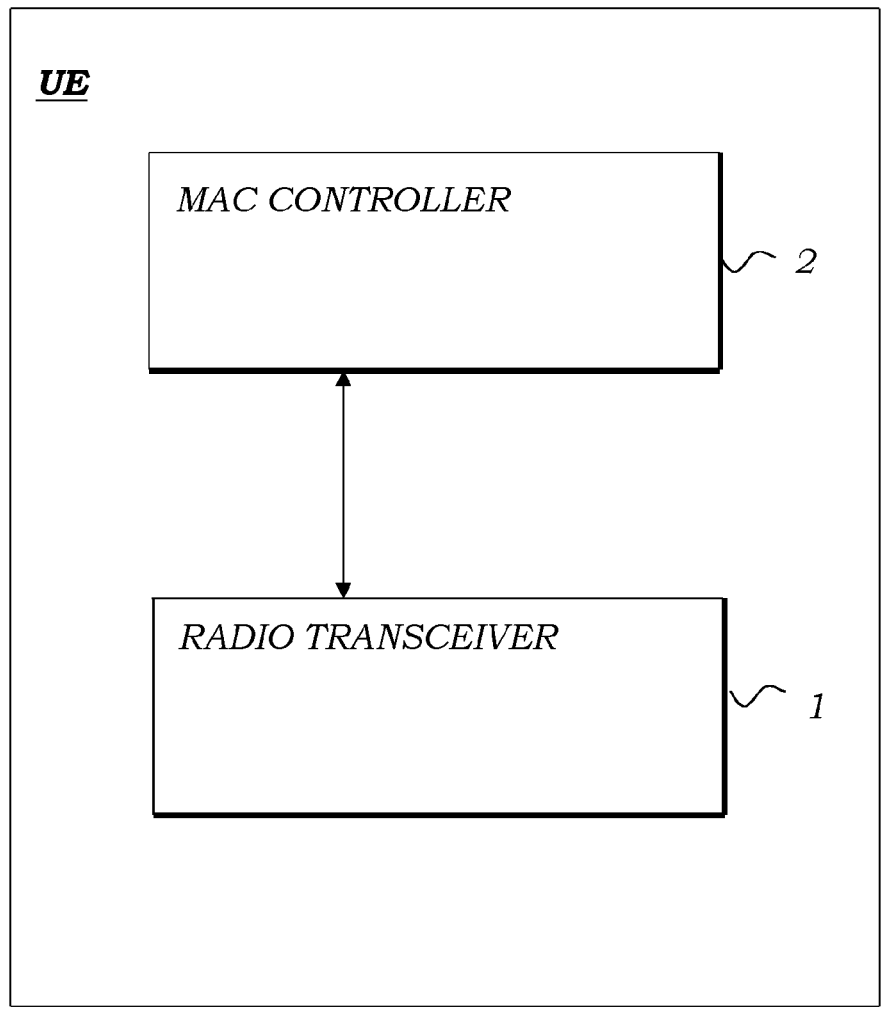
FIG. 25 is a schematic illustration of an alternative exemplary UE according to the proposed technology.

In FIG. 24 and FIG. 25 there are schematically disclosed embodiments of a User Equipment, UE, that is configured to enable a recipient of a MAC level message to determine whether at least part of a payload of the MAC level message is to be intercepted, decoded and/or processed. The UE comprises a radio transceiver 1 that is configured for receiving configuration information comprising information to add additional information to a MAC level message. It further comprises a MAC Controller 2 that is configured for creating a bit string representing the additional information and adding the created bit string to the MAC level message to enable a recipient of the MAC level message to determine, based on the information represented by the bit string, whether at least part of a payload of the MAC level message is to be intercepted, decoded and/or processed.

In a particular embodiment, the User Equipment, UE, will comprise a MAC Controller 2 that is configured to create a bit string and add the created bit string to a MAC level message that is a MAC PDU message with a payload and wherein the bit string is a MAC layer header comprising the additional information represented by the bit string.

In another embodiment of a User Equipment, where the payload of said MAC PDU message comprises a MAC SDU message, will the MAC Controller 2 be configured for creating and appending a MAC layer header to the MAC level message. In other words, when the MAC level message is a MAC PDU message with a payload that comprises a MAC SDU message, the MAC controller 2 will be configured for creating a bit string that is a MAC layer header and append the MAC layer header to the MAC SDU message.

In a particular example of the described embodiment of a User Equipment is the MAC Controller configured for creating a MAC layer header that is a MAC-i header representing additional information comprising information identifying a Logical Channel Identity, LCH-ID.

In still another embodiment of a User Equipment is the MAC Controller 2 configured to create a bit string representing additional information identifying the Logical Channel Identity, LCH-ID. This can, as has been stated, also be used in the embodiment where the bit string is a MAC layer header, such as a MAC-i header.

In an alternative version of an embodiment of a User Equipment where the MAC level message is an 18 bit message comprising a four bit Highest Logical Channel, HLID, field, and where at least part of the remaining bits comprises the payload, is the MAC Controller 2 configured for creating a four bit long bit string representing additional information indicating whether at least part of a payload of the MAC level message is to be intercepted, decoded and/or processed. The MAC Controller is also configured for adding the bit string to the MAC level message by inserting it in to the Highest Logical Channel, HLID, field.

In a particular version of this embodiment of a User Equipment is the MAC Controller configured for creating a four bit long bit string representing additional information identifying a Logical Channel Identity, LCH-ID.

In still another embodiment of the alternative User Equipment is the MAC Controller 2 configured for creating a bit string representing an LCH-ID that is an LCH-ID that is not used by any of the scheduled flows.

In a particular application of the technology will an embodiment of a User Equipment according to any of the versions described above, comprise a MAC Controller 2 that is configured for creating and adding a bit string to a MAC level message that is a UE measurement report and where the configuration information comprises information on how to configure the measurement and the measurement reporting.

In still another possible embodiment, that can be combined with all earlier described ones, will the User Equipment comprise a MAC Controller 2 that is configured for creating and adding a bit string to a MAC level message to enable interception, decoding and processing of at least part of a payload of the MAC level message.

As has been stated earlier, the configuration information received by the UE and generated by the Radio Network Controller, RNC, might in addition also comprise information about the type of MAC level message that is to be transmitted, for example, a measurement report.

In slightly different wording, in certain embodiments there is provided a UE that includes a radio transceiver and one or more antennas, one or more user interfaces, and one or more data processors for controlling the UE and performing various control functions. A MAC controller, an RLC controller, and upper protocol layer controllers include computer-implemented entities for performing functions at that layer. The MAC controller also performs the header generation/MAC-i PDU tagging functions described above for the UE. The RLC controller communicates with the MAC controller and one or more upper protocol layers. Also shown is a measurement controller that controls the UE to make measurements and prepare measurement reports for the NodeB and/or RNC.

Figure 27:
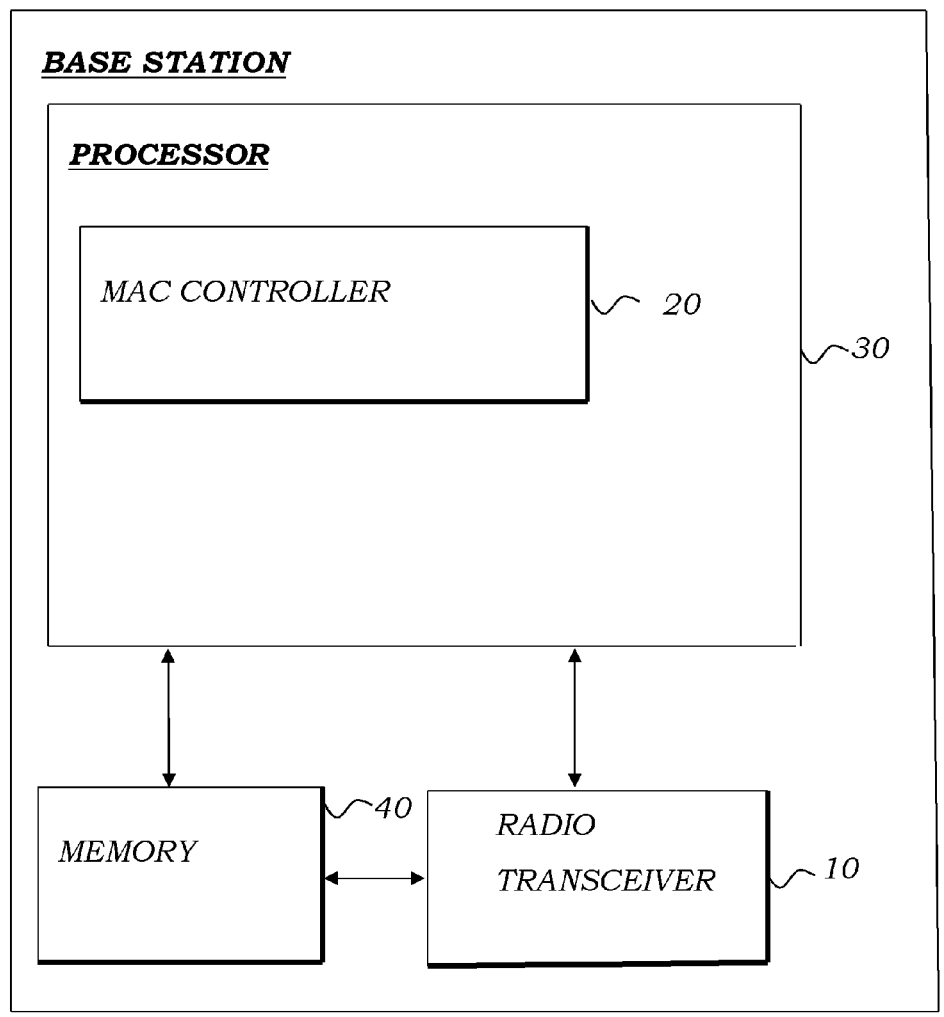
FIG. 27 is a schematic illustration of an exemplary base station according to the proposed technology
Figure 28:
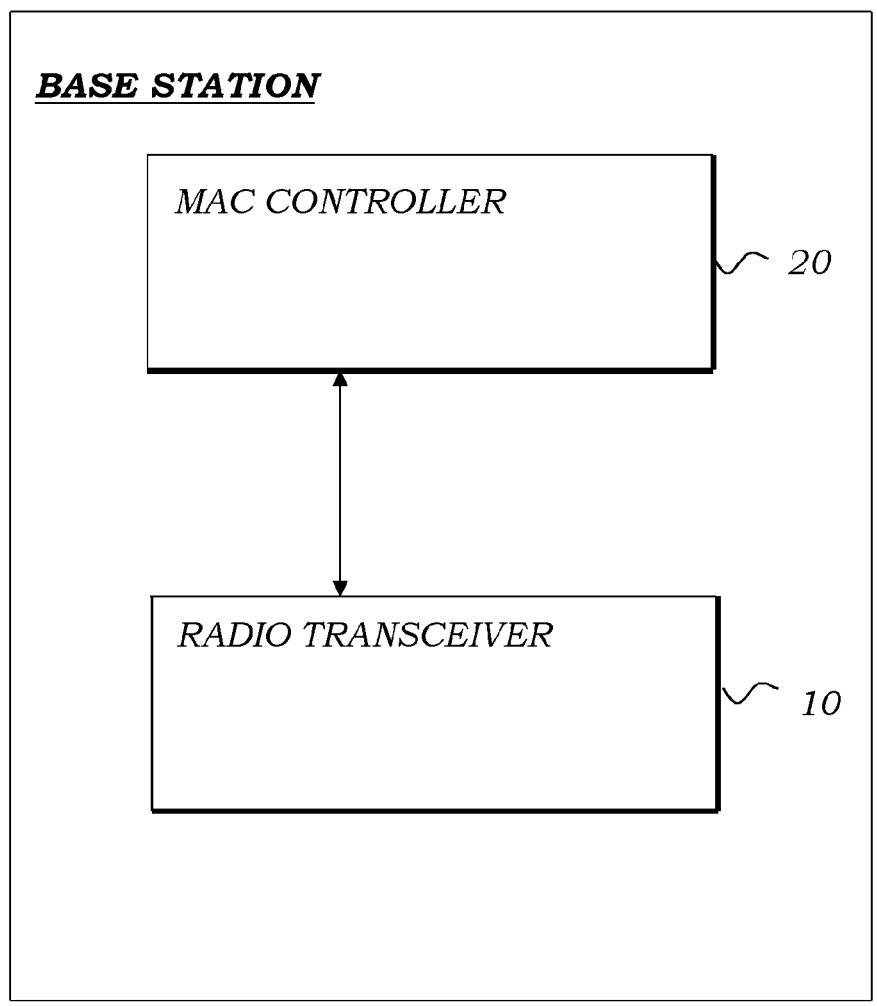
FIG. 28 is a schematic illustration of an alternative exemplary base station according to the proposed technology.

In FIG. 27 there is disclosed a base station that is configured for determining whether at least part of MAC level message should be intercepted, decoded and/or processed. The base station comprises a radio transceiver 10 that is configured for receiving a MAC level message with an added bit string comprising information whether at least part of a payload of the MAC level message is to be intercepted, decoded and/or processed, and a MAC controller 20 configured for decoding the bit string added to the MAC level message to determine whether the bit string comprises information indicating that at least part of a payload of the MAC level message should be intercepted, decoded and/or processed.

In a particular version of a base station, where the MAC level message is a MAC PDU message with a payload, is the MAC Controller 20 configured for decoding an added bit string that is a MAC layer header.

In an exemplary version of the above given base station, where the payload of the MAC PDU message is a MAC SDU message, is the MAC Controller 20 configured for decoding the MAC layer header.

In still another exemplary version of a base station, is the MAC controller 20 configured for decoding a MAC layer header that is a MAC-i header.

In a particular example, relevant for all earlier described base station embodiments, is the MAC Controller configured for decoding the bit string to obtain additional information comprising information identifying a Logical Channel Identity, LCH-ID.

In an alternative version of an embodiment of a base station, where the MAC level message is an 18 bit message comprising a four bit Highest Logical Channel, HLID, field, and where at least part of the remaining bits comprises the payload, and where the bit string is a four bit long bit inserted into the HLID field, is the MAC Controller 20 configured for decoding the bit string inserted into the HLID field to determine whether the bit string comprises information indicating that at least part of the payload of the 18 bit message is to be intercepted, decoded and/or processed.

In a particular example of the latter base station is the MAC Controller 20 configured to decode the four bit long bit string inserted into said HLID field to identify a Logical Channel Identity, LCH-ID.

In another example of an embodiment of a base station is the received MAC level message a UE measurement report and the MAC Controller 20 is configured to decode the added bit string to determine whether the payload of the measurement report is to be intercepted, decoded and/or processed.

In a particular version of a base station according to the earlier described embodiments is the MAC Controller 20 configured for decoding the bit string to determine whether the bit string includes information indicating that at least part of a payload of the MAC level message should be intercepted, decoded and processed.

As has been stated earlier, the configuration information generated by the Radio Network Controller, RNC, might in addition also comprise information about the type of MAC level message that is to be transmitted, for example, a measurement report.

In a slightly different wording, with reference to FIG. 20, the base station might be a NodeB that includes multiple radio transceivers and one or more antennas and a MAC controller including a MAC controller. The MAC controller includes a MAC-i header controller for examining MAC-i PDU headers. The RNC includes a configuration controller with upper layer, RLC, and MAC layer controllers. The configuration controller generates the configuration information sent to the UE as described above.

The technology described here includes many advantages, including for example, implementing additional "intelligence" in the base station in an evolved HSPA system that maintains the current architectures and protocols for the evolved HSPA system. One example of that intelligence is the UE conveying signaling messages (MAC-i reports) directly to the NodeB which is much quicker than the RRC and Iub signaling. The use of the ASN.1 syntax, such as shown in example embodiments, provides full flexibility to extend the MAC signaling messages and their size.

Although the description above contains many specifics, they should not be construed as limiting but as merely providing illustrations of some presently preferred embodiments. Embodiments described herein may be considered as independent embodiments or may be considered in any combination with each other to describe non-limiting examples. Although non-limiting, example embodiments of the technology were described in a UTRAN context, the principles of the technology described may also be applied to other radio access technologies. For example, in an LTE system, the NodeB and RNC in UTRAN correspond to a single node, the eNodeB, in LTE. While the error detection and error correction mechanisms would be similar, the configuration and signaling would be different. For example, there is no need to signal between the RNC and the NodeB, and the RRC signaling between the RNC and UE would be handled by RRC signaling between the UE and eNodeB.

Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

As used herein, the term "wireless device" may refer to a User Equipment, UE, a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a portable electronic radio communication device, a sensor device equipped with radio communication capabilities or the like. In particular, the term "UE" should be interpreted as a non-limiting term comprising any device equipped with radio circuitry for wireless communication according to any relevant communication standard.

As used herein, the term "radio network node" or simply "network node" may refer to base stations, network control nodes, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, and even radio control nodes controlling one or more Remote Radio Units, RRUs, or the like.

Moreover, the UE and the base station as has been described earlier may also include radio circuitry for communication with one or more other nodes, including transmitting and/or receiving information.

The steps, functions, procedures, modules and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described above may be implemented in software such as a computer program for execution by suitable processing circuitry including one or more processing units.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

The flow diagram or diagrams presented above may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Figure 26:
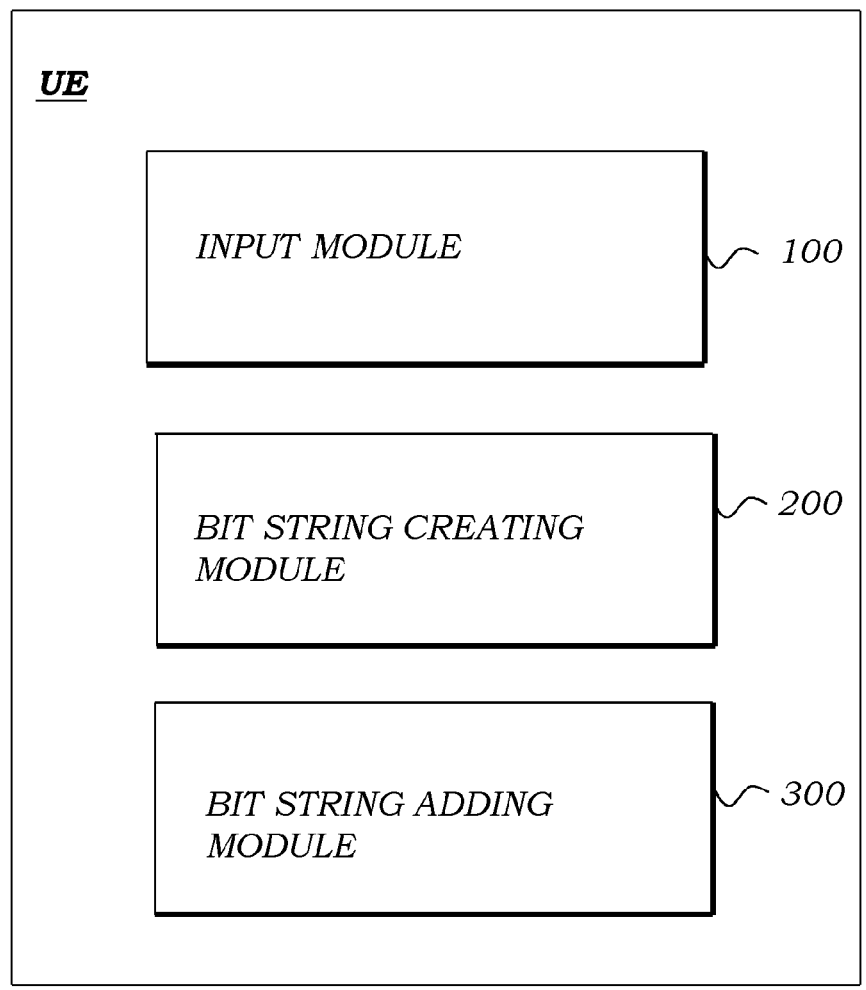
FIG. 26 is a schematic illustration of an example of function module flow for a UE according to the proposed technology.

A particular set of function modules is illustrated in FIG. 26. This schematic diagram illustrates a User Equipment, UE, for enabling a recipient of a MAC level message to determine whether at least part of a payload of the MAC level message is to be intercepted, decoded and/or processed, the UE comprises an input module 100 for receiving configuration information comprising information that additional information should be added to a MAC level message, a bit string creating module 200 for creating a bit string representing the additional information and a bit string adding module 300 for adding the created bit string to the MAC level message, to enable a recipient of the MAC level message to determine, based on the information represented by the bit string, whether at least part of a payload of the MAC level message is to be intercepted, decoded and/or processed.

Figure 29:
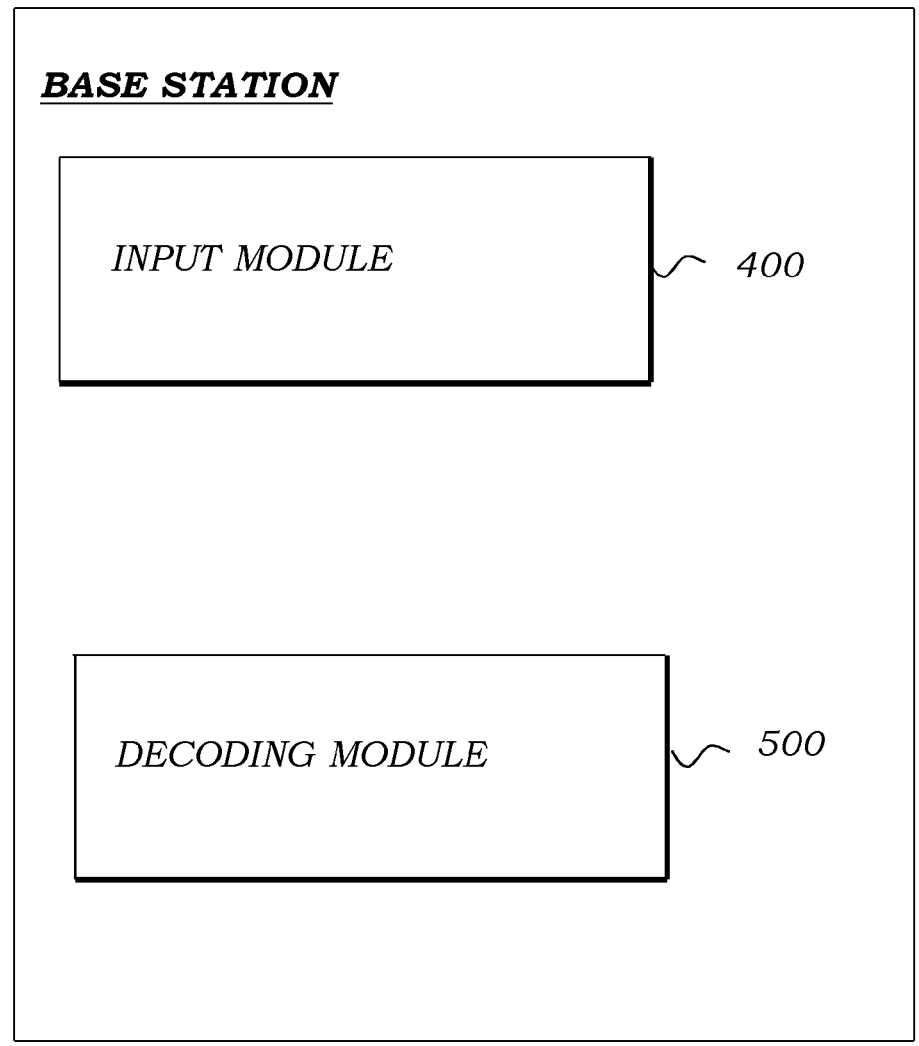
FIG. 29 is a schematic illustration of an example of function module flow for a base station according to the proposed technology.

In FIG. 29 there is schematically illustrated a set of function modules corresponding to a base station for determining whether at least part of a MAC level message should be intercepted, decoded and/or processed. The illustrated base station comprises an input module 400 for receiving a MAC level message comprising an added bit string comprising information whether at least part of a payload of the MAC level message is to be intercepted, decoded and/or processed. It also comprises a decoding module 500 for decoding the bit string, added to the MAC level message, to determine whether the bit string includes information indicating that at least part of the payload of the MAC level message is to be intercepted, decoded and/or processed.

As indicated above, the wireless device may alternatively be defined as a group of function modules, where the function modules are implemented as a computer program running on a processor.

FIG. 24 is a schematic block diagram illustrating an example of a User Equipment, UE, comprising a processor and an associated memory.

The computer program residing in memory may thus be organized as appropriate function modules configured to perform, when executed by the processor, at least part of the steps and/or tasks described above. An example of such function modules is illustrated in FIG. 26.

FIG. 27 is a schematic block diagram illustrating an example of a base station comprising a processor and an associated memory.

FIG. 29 is a schematic block diagram illustrating an example of a base station comprising a group of function modules.

The computer program residing in memory may thus be organized as appropriate function modules configured to perform, when executed by the processor, at least part of the steps and/or tasks described above The software or computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program may thus be loaded into the operating memory of a computer or equivalent processing device for execution by the processing circuitry thereof.

For example, the computer program stored in memory includes program instructions executable by the processing circuitry, whereby the processing circuitry is able or operative to execute the above-described steps, functions, procedure and/or blocks.

The User Equipment and the base station are thus configured to perform, when executing the computer program, well-defined processing tasks such as those described above.

The computer or processing circuitry does not have to be dedicated to only execute the above-described steps, functions, procedure and/or blocks, but may also execute other tasks.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

3GPP 3$^{rd}$ Generation Partnership Project
ASN Abstract Syntax Notation
CCCH Common Control Channel
DCCH Dedicated Control Channel
DCH Dedicated Channel
DTCH Dedicated Traffic Channel
E-DCH Enhanced Dedicated Channel
FACH Forward Access Channel
HARQ Hybrid Automatic Repeat Request
HLBS Highest priority Logical channel Buffer Status
HLID Highest priority Logical channel ID
L 1 Layer 1 (physical layer)
LCH-ID Logical Channel Identifier
MAC Medium Access Control Protocol
AM Acknowledged Mode
PDU Protocol Data Unit
RACH Random Access Channel
RLC Radio Link Control
RRC Radio Resource Control Protocol
SDU Service Data Unit
SI Scheduling Information
SIB System Information Block
TEBS Total E-DCH Buffer Status
UE User Equipment
FDD Frequency Division Duplexing
TTI Time Transmission Interval
UE User Equipment
UPH UE Power Headroom
UTRA UMTS Terrestrial Radio Access

REFERENCES

[1] 3GPP TS 25.215: "Physical layer—Measurements (FDD)", section [5.1], Version 11.0.0, December 2012
[2] 3GPP TS 25.321: "Medium Access Control (MAC) protocol specification", sections [4.2, 9.1, 9.2], Version 11.3.0, Jan. 3, 2013
[3] 3GPP TS 25.331: "Radio Resource Control (RRC) protocol specification", sections [6.3, 8.4, 12] Version 11.4.0, Jan. 3, 2013
[4] 3GPP TS 25.301: "Radio interface protocol architecture", section [5.6], Version 11.0.0, September 2012
[5] 3GPP TS 25.308: "High Speed Downlink Packet Access (HSDPA), Overall description, Stage 2", section [6.1], Version 11.3.0, Jan. 3, 2013

The invention claimed is:

1. A method performed by a User Equipment, UE, for enabling interception, decoding and/or processing of at least parts of a Media Access Control, MAC, level message, the method comprises the steps of:
   receiving configuration information comprising information to add additional information to a MAC level message;
   creating a bit string representing said additional information, wherein the bit string is indicative of whether at least part of a payload of said MAC level message is to be intercepted, decoded and/or processed,
   adding said created bit string to said MAC level message, to enable a recipient of said MAC level message to determine, based on the additional information represented by said bit string, whether at least part of a payload of said MAC level message is to be intercepted, decoded and/or processed.

2. The method according to claim 1, wherein said MAC level message is a MAC PDU message with a payload and wherein said step of creating a bit string comprises the step of creating a MAC layer header comprising the additional information represented by said bit string.

3. The method according to claim 2, wherein the payload of said MAC PDU message comprises a MAC SDU message and wherein said step of adding comprises the step of appending said created MAC layer header to said MAC SDU message.

4. The method according to claim 2, wherein said MAC layer header is a MAC-i header representing additional information comprising information identifying a Logical Channel Identity, LCH-ID.

5. The method according to claim 1, where said MAC level message is an 18 bit message comprising a four bit Highest Logical Channel, HLID, field, and where at least part of the remaining bits comprises the payload, and wherein the step of creating a bit string comprises creating a four bit long bit string representing said additional information and wherein the step of adding said bit string comprises inserting said bit string into the Highest Logical Channel ID, HLID, field carried by said 18 bit message.

6. The method according to claim 1, wherein the step of creating a bit string comprises creating a four bit long bit string representing additional information identifying a Logical Channel Identity, LCH-ID.

7. The method according to claim 1, wherein said MAC level message is a UE measurement report and wherein said configuration information comprises information on how to configure the measurement and the measurement reporting.

8. A method performed by a base station for determining whether at least part of a Media Access Control, MAC, level message, is to be intercepted, decoded and/or processed, the method comprises the steps of:
receiving a MAC level message comprising an added bit string comprising information whether at least part of a payload of said MAC level message is to be intercepted, decoded and/or processed;
decoding said bit string, added to said MAC level message, to determine whether said bit string comprises information indicating that at least part of a payload of said MAC level message is to be intercepted, decoded and/or processed.

9. The method according to claim 8, wherein said MAC level message is a MAC PDU message with a payload and wherein said added bit string is a MAC layer header.

10. The method according to claim 9, wherein said payload of said MAC PDU message comprises a MAC SDU message with an added MAC layer header, and wherein said step of decoding is performed on the added MAC layer header.

11. The method according to claim 9, wherein said MAC layer header is a MAC-i header.

12. The method according to claim 8, wherein the information carried by the bit string, indicating that at least part of the payload of said MAC level message is to be intercepted, decoded and/or processed, comprises information identifying a Logical Channel Identity, LCH-ID.

13. The method according to claim 8, wherein said MAC level message is an 18 bit message comprising a four bit Highest Logical Channel, HLID, field and where at least part of the remaining bits comprises the payload, and wherein said step of decoding said bit string comprises decoding a four bit long bit string inserted into said Highest Logical Channel, HLID, field to determine whether said bit string comprises information indicating that at least part of the payload of said 18 bit message is to be intercepted, decoded and/or processed.

14. The method according to claim 8, wherein said step of decoding said four bit long bit string inserted into said Highest Logical Channel, HLID, field, is performed to identify a Logical Channel Identity, LCH-ID.

15. The method according to claim 8, wherein said MAC level message is a UE measurement report.

16. A User Equipment, UE, configured to enable interception, decoding and/or processing of at least parts of a Media Access Control, MAC, level message, wherein the UE comprises:
a radio transceiver configured for receiving configuration information comprising information to add additional information to a MAC level message;
a MAC Controller configured for creating a bit string representing said additional information and adding said created bit string to said MAC level message, to enable a recipient of said MAC level message to determine, based on the information represented by said bit string, whether at least part of a payload of said MAC level message is to be intercepted, decoded and/or processed.

17. The User equipment according to claim 16, wherein said MAC Controller is configured to create a bit string and add said created bit string to a MAC level message that is a MAC PDU message with a payload and wherein said bit string is a MAC layer header comprising the additional information represented by said bit string.

18. The User Equipment according to claim 17, wherein the payload of said MAC PDU message comprises a MAC SDU message and said MAC Controller is configured for creating and appending a MAC layer header to said MAC SDU message.

19. The User Equipment according to claim 16, wherein said MAC Controller, is configured for creating a MAC-layer header that is a MAC-i header representing additional information comprising information identifying a Logical Channel Identity, LCH-ID.

20. The User Equipment according to claim 16, where said MAC level message is an 18 bit message comprising a four bit Highest Logical Channel, HLID, field, and where at least part of the remaining bits comprises the payload, wherein said MAC Controller is configured for, creating a four bit long bit string representing said additional information and adding said bit string to the MAC level message by inserting it in to the Highest Logical Channel, HLID, field.

21. The User Equipment according to claim 16, wherein said MAC Controller is configured for creating a four bit long bit string representing additional information identifying a Logical Channel Identity, LCH-ID.

22. The User Equipment according to claim 16, wherein said MAC Controller is configured for creating a bit string and adding said bit string to a MAC level message that is a UE measurement report and wherein said configuration information comprises information on how to configure the measurement and the measurement reporting.

23. A Base station configured for determining whether at least part of a MAC level message should be intercepted, decoded and/or processed, the base station comprises:
a radio transceiver configured for receiving a MAC level message with an added bit string comprising information whether at least part of a payload of said MAC level message is to be intercepted, decoded and/or processed;
a MAC controller configured for decoding said bit string added to said MAC level message to determine whether said bit string comprises information indicating that at least part of a payload of said MAC level message should be intercepted, decoded and/or processed.

24. The base station according to claim 23, wherein said MAC level message is a MAC PDU message with a payload and said MAC Controller is configured for decoding an added bit string that is a MAC layer header.

25. The base station according to claim 24, wherein said payload of said MAC PDU message comprises a MAC SDU message and said MAC controller is configured for decoding said MAC layer header.

26. The base station according to claim 24, wherein said MAC layer header is a MAC-i header.

27. The base station according to claim 23, wherein said MAC Controller is configured for decoding said bit string to obtain additional information comprising information identifying a Logical Channel Identity, LCH-ID.

28. The base station according to claim 23, wherein said MAC level message is an 18 bit message comprising a four bit Highest Logical Channel, HLID, field, and where at least part of the remaining bits comprises the payload, and where said bit string is a four bit long bit inserted into said HLID field, and wherein said MAC Controller is configured for decoding said bit string inserted into said HLID field to determine whether said bit string comprises information indicating that at least part of the payload of said 18 bit message is to be intercepted, decoded and/or processed.

29. The base station according to claim 23, wherein said MAC Controller is configured to decode said four bit long bit string inserted into said HLID field to identify a Logical Channel Identity, LCH-ID.

30. The base station according to claim 23, wherein said received MAC level message is a UE measurement report and said MAC Controller is configured to decode said added bit string to determine whether the payload of said measurement report is to be intercepted, decoded and/or processed.

* * * * *